(12) United States Patent
Wang

(10) Patent No.: US 11,647,548 B2
(45) Date of Patent: May 9, 2023

(54) NETWORK ACCESS METHOD, DEVICE, AND SYSTEM

(71) Applicant: HUAWEI TECHNOLOGIES CO., LTD., Shenzhen (CN)

(72) Inventor: Yafei Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 16/968,042

(22) PCT Filed: Feb. 7, 2018

(86) PCT No.: PCT/CN2018/075633
§ 371 (c)(1),
(2) Date: Aug. 6, 2020

(87) PCT Pub. No.: WO2019/153143
PCT Pub. Date: Aug. 15, 2019

(65) Prior Publication Data
US 2021/0235516 A1    Jul. 29, 2021

(51) Int. Cl.
*H04W 76/10* (2018.01)
*H04W 12/06* (2021.01)
(Continued)

(52) U.S. Cl.
CPC ........... *H04W 76/10* (2018.02); *H04W 12/06* (2013.01); *H04W 48/08* (2013.01); *H04L 12/189* (2013.01)

(58) Field of Classification Search
CPC ..... H04W 76/10; H04W 12/06; H04W 48/08; H04W 48/12; H04W 84/12;
(Continued)

(56) References Cited

U.S. PATENT DOCUMENTS

| 9,961,553 | B2* | 5/2018 | Fan ........................ H04W 12/35 |
| 2017/0150362 | A1* | 5/2017 | Clemenson ......... H04L 41/0806 |
| 2019/0173756 | A1* | 6/2019 | Panje .................. H04L 41/0883 |

FOREIGN PATENT DOCUMENTS

| CN | 104427501 A | 3/2015 |
| CN | 104936304 A | 9/2015 |

(Continued)

OTHER PUBLICATIONS

Chinese Office Action issued in corresponding Chinese Application No. 201880036720.X, dated Jun. 11, 2021, pp. 1-10.
(Continued)

*Primary Examiner* — Brandon J Miller
(74) *Attorney, Agent, or Firm* — Hauptman Ham, LLP

(57) ABSTRACT

A network access method includes receiving, by a first access point, a first network identifier and a first password of a second access point from a server, setting, by the first access point, a first network based on a first network identifier and a first password of the second access point, sending, by an intelligent device, a first network connection request, establishing, by the first access point, a first network connection between the first access point and the intelligent device in response to the first network connection request, sending, by the first access point, a second network identifier or a second password of the first access point to the intelligent device by the first network connection, and sending, by the intelligent device, a second network connection request to the first access point based on the second network identifier or the second password of the first access point.

10 Claims, 19 Drawing Sheets

(51) Int. Cl.
*H04W 48/08* (2009.01)
*H04L 12/18* (2006.01)

(58) Field of Classification Search
CPC ... H04W 12/084; H04W 12/35; H04W 48/16; H04W 88/08; H04L 12/189; H04L 12/2898; H04L 63/083; H04L 12/2869
See application file for complete search history.

(56) References Cited

FOREIGN PATENT DOCUMENTS

| CN | 105187433 A | 12/2015 |
|----|-------------|---------|
| CN | 105208631 A | 12/2015 |
| CN | 105376731 A | 3/2016 |
| CN | 105376738 A | 3/2016 |
| CN | 105744595 A | 7/2016 |
| CN | 106550383 A | 3/2017 |
| EP | 3151628 A1 | 4/2017 |
| WO | 2015035795 A1 | 3/2015 |

OTHER PUBLICATIONS

International Search Report issued in corresponding International Application No. PCT/CN2018/075633, dated Aug. 13, 2018, State Intellectual Property Office of the P.R. China, Beijing, China.
Extended European Search Report from corresponding application No. EP 18905334.1 (pp. 1-9).
Chinese Office Action issued in corresponding Chinese Application No. 201880036720.X, dated Jan. 6, 2021, pp. 1-11.

* cited by examiner

NETWORK ACCESS METHOD, DEVICE, AND SYSTEM

CROSS-REFERENCE TO RELATED APPLICATIONS

This application is a National Stage of International Patent Application No. PCT/CN2018/075633, filed on Feb. 7, 2018.

TECHNICAL FIELD

This application relates to the field of communications technologies, and in particular, to a network access method, a device, and a system.

BACKGROUND

With popularity and development of the Internet of Things, more intelligent devices support wireless fidelity (wireless fidelity, WIFI) access. Many types of intelligent devices, for example, an intelligent lamp, an intelligent socket, or an intelligent curtain, do not have any user input interface. WIFI network configuration problems of such types of intelligent devices are increasingly notable.

For an intelligent device having no user input interface, generally auxiliary network configuration needs to be performed by using a device having a user input interface. Currently, a mainstream network configuration mode in the industry is a multicast/broadcast network configuration mode. Referring to FIG. 1, in this mode, an intelligent device obtains, by listening to a multicast/broadcast packet sent by a mobile phone, valid information carried in the multicast/broadcast packet, such as a service set identifier (service set identifier, SSID) and a password of a router, to access, based on the SSID and the password, a WIFI network configured by the router.

The valid information such as the SSID and the password is transmitted by using information content that is not encrypted in the multicast/broadcast packet. For example, the multicast packet may carry valid information by using a media access control (media access control, MAC) address and a packet length, and the broadcast packet may carry valid information such as the SSID and the password by using a packet length. Therefore, valid information that can be carried by each multicast/broadcast placket is very limited. In addition, considering a case of a packet loss, to obtain the SSID and the password, the intelligent device usually needs to receive dozens of or more multicast/broadcast packets. In addition, because a transmitting/receiving capability of the intelligent device is lower than that of the mobile phone, and efficiency of receiving the multicast/broadcast packet by the intelligent device is relatively low, it needs to take the intelligent device a relatively long time to receive sufficient multicast/broadcast packets to obtain valid information such as the SSID and the password.

Therefore, efficiency of obtaining the SSID and the password by the intelligent device by using the multicast/broadcast packet is relatively low. Consequently, network configuration efficiency of the intelligent device is relatively low, and user experience is relatively poor.

SUMMARY

Embodiments of this application provide a network access method, a device, and a system to quickly obtain a network identifier and/or a password of a wireless network to be accessed, thereby accessing the wireless network and improving network configuration efficiency.

To achieve the foregoing objective, the following technical solutions are used in the embodiments of this application:

According to one aspect, an embodiment of this application provides a network access method, including: sending, by an intelligent device, a first network connection request to a first access point; establishing, by the first access point, a first network connection between the first access point and the intelligent device in response to the first network connection request; sending, by the intelligent device, a first device identifier of the intelligent device to the first access point; forwarding, by the first access point, the first device identifier received from the intelligent device to a server; obtaining, by user equipment, the first device identifier of the intelligent device, and sending the first device identifier to the server; after the first device identifier received from the user equipment matches the first device identifier received from the first access point, instructing, by the server, the first access point to send a first network identifier and a first password of a second access point to the intelligent device; sending, by the first access point in response to the instruction of the server, the first network identifier and the first password to the intelligent device by using the first network connection; and after receiving the first network identifier and the first password sent by the first access point, sending, by the intelligent device, a second network connection request to the second access point based on the first network identifier and the first password.

In the solution, the intelligent device may establish a communication channel between the intelligent device and the first access point by using a pre-connected network, obtain the first network identifier and the first password of the second access point from the first access point quickly and accurately by using the channel and only a few packets, and therefore access a wireless network of the second access point based on the first network identifier and the first password. Therefore, network configuration efficiency and a network configuration success rate can be improved, and user experience can be improved.

In a possible design, the server stores a mapping relationship between an account and an access point, and the instructing, by the server, the first access point to send a first network identifier and a first password of a second access point to the intelligent device includes: sending, by the server to the first access point, a network identifier and a password of the access point corresponding to the account, to instruct the first access point to send, to the intelligent device, the network identifier and the password of the access point corresponding to the account.

In a possible design, the server stores a mapping relationship between an account and at least one access point, and the instructing, by the server, the first access point to send a first network identifier and a first password of a second access point to the intelligent device includes: sending, by the server to the first access point, a network identifier and a password of an access point that is in the at least one access point and is currently accessed by the user equipment, to instruct the first access point to send, to the intelligent device, the network identifier and the password of the access point currently accessed by the user equipment.

In a possible design, the instructing, by the server, the first access point to send a first network identifier and a first password of a second access point to the intelligent device includes: receiving, by the server, first indication information sent by the user equipment, where the first indication information includes at least one of a device identifier of the second access point or the first network identifier of the second access point; and sending, by the server, the first network identifier and the first password of the second access point to the first access point, to instruct the first access point to send the first network identifier and the first password of the second access point to the intelligent device.

In a possible design, before the sending, by an intelligent device, a first network connection request to a first access point, the method further includes: searching, by the intelligent device, for a network identifier of a first network; and the sending, by an intelligent device, a first network connection request to a first access point includes: after the network identifier of the first network found by the intelligent device matches that stored by the intelligent device, sending, by the intelligent device, the first network connection request to the first access point.

In a possible design, the first network is an open network. The first network is a pre-connected network, and the open network has no password, that is, the intelligent device may access the pre-connected network having no password.

In a possible design, the second access point and the first access point are different; and the intelligent device may first access a pre-connected network of an access point, and then access a wireless network of another access point.

In a possible design, the second access point and the first access point are the same; and the intelligent device may first access a pre-connected network of an access point, and then access a wireless network of the access point.

According to another aspect, an embodiment of this application provides a network access method, including: sending, by an intelligent device, a first network connection request to a first access point; establishing, by the first access point, a first network connection between the first access point and the intelligent device in response to the first network connection request; sending, by the intelligent device, a first device identifier of the intelligent device to the first access point; forwarding, by the first access point, the first device identifier received from the intelligent device to a server; obtaining, by user equipment, the first device identifier of the intelligent device, and sending the first device identifier to the server, where the first device identifier is used by the server to determine whether the first device identifier received from the first access point is matched; sending, by the first access point in response to an instruction of the server, a first network identifier and a first password to the intelligent device by using the first network connection; and after receiving the first network identifier and the first password sent by the first access point, sending, by the intelligent device, a second network connection request to a second access point based on the first network identifier and the first password.

In a possible design, before the sending, by an intelligent device, a first network connection request to a first access point, the method further includes: searching, by the intelligent device, for a network identifier of a first network; and the sending, by an intelligent device, a first network connection request to a first access point includes: after the network identifier of the first network found by the intelligent device matches that stored by the intelligent device, sending, by the intelligent device, the first network connection request to the first access point.

In a possible design, the second access point and the first access point are the same or different.

In a possible design, the first network is an open network.

According to another aspect, an embodiment of this application provides a network access method, including: establishing, by a first access point, a first network connection between the first access point and an intelligent device; receiving, by the first access point, a first device identifier of the intelligent device that is sent by the intelligent device, and forwarding the first device identifier received from the intelligent device to a server, where the first device identifier is used to trigger the server to instruct the first access point to send a first network identifier and a first password of a second access point to the intelligent device; and sending, by the first access point in response to the instruction of the server, the first network identifier and the first password of the second access point to the intelligent device by using the first network connection, where the first network identifier and the first password are used by the intelligent device to send a second network connection request to the second access point.

In a possible design, the forwarding, by the first access point, the first device identifier received from the intelligent device to a server includes: sending, by the first access point, a network configuration request to the server, where the network configuration request includes the first device identifier of the intelligent device.

In a possible design, the second access point and the first access point are the same or different.

In a possible design, the first network is an open network.

According to another aspect, an embodiment of this application provides a network access method, including: sending, by an intelligent device, a first network connection request to a first access point; after establishing a first network connection between the intelligent device and the first access point, receiving, by the intelligent device by using the first network connection, a first network identifier and a first password sent by the first access point; and sending, by the intelligent device, a second network connection request to a second access point based on the first network identifier and the first password.

In a possible design, before the sending, by an intelligent device, a first network connection request to a first access point, the method further includes: searching, by the intelligent device, for a network identifier of a first network; and the sending, by an intelligent device, a first network connection request to a first access point includes: after the network identifier of the first network found by the intelligent device matches that stored by the intelligent device, sending, by the intelligent device, the first network connection request to the first access point.

In a possible design, before the receiving, by the intelligent device, a first network identifier and a first password sent by the first access point, the method further includes: sending, by the intelligent device, a first device identifier of the intelligent device to the first access point.

In a possible design, there are a plurality of second access points, and the sending, by the intelligent device, a second network connection request to a second access point based on the first network identifier and the first password includes: sending, by the intelligent device based on a first network identifier and a first password of a second access point with highest signal strength, the second network connection request to the second access point with highest signal strength.

According to another aspect, an embodiment of this application provides a network access method, including: receiving, by a server, a first device identifier sent by a first access point; and instructing, by the server, the first access point to send a first network identifier and a first password of a second access point to an intelligent device.

In a possible design, the instructing, by the server, the first access point to send a first network identifier and a first password of a second access point to an intelligent device includes: receiving, by the server, a first device identifier of the intelligent device that is sent by user equipment; and after the first device identifier received from the user equipment matches the first device identifier received from the first access point, instructing, by the server, the first access point to send the first network identifier and the first password of the second access point to the intelligent device.

According to another aspect, an embodiment of this application provides a network access method, including: sending, by an intelligent device, a first network connection request to an access point; establishing, by the access point, a first network connection between the access point and the intelligent device in response to the first network connection request; sending, by the intelligent device, a first device identifier of the intelligent device to the access point; sending, by user equipment, a room identifier to a server by using a login account, where the server stores a mapping relationship between an account and network configuration parameters, the network configuration parameters include an access point, a room identifier, and n device identifiers corresponding to the room identifier, and n is a positive integer; sending, by the server to the access point corresponding to the room identifier, the n device identifiers corresponding to the room identifier; after receiving the n device identifiers sent by the server, if determining that the first device identifier matches the n device identifiers, sending, by the access point, a network identifier and a password of the access point to the intelligent device by using the first network connection; and after receiving the network identifier and the password sent by the access point, sending, by the intelligent device, a second network connection request to the access point based on the network identifier and the password.

In a possible design, the first network is an open network.

According to another aspect, an embodiment of this application provides a network access method, including: sending, by an intelligent device, a first network connection request to an access point; establishing, by the access point, a first network connection between the access point and the intelligent device in response to the first network connection request; sending, by the intelligent device, a first device identifier of the intelligent device to the access point; sending, by user equipment, a room identifier to a server by using a login account; receiving, by the access point, n device identifiers corresponding to the room identifier and sent by the server, where n is a positive integer; if the first device identifier matches the n device identifiers, sending, by the access point, a network identifier and a password of the access point to the intelligent device by using the first network connection; and after receiving the network identifier and the password sent by the access point, sending, by the intelligent device, a second network connection request to the access point based on the network identifier and the password.

In the solution, the intelligent device may establish a communication channel between the intelligent device and the access point by using a pre-connected network, and receive, by using the channel in point-to-point mode, a packet sent by the access point, and therefore can obtain the network identifier and the password from the access point quickly and accurately by receiving only a few packets and access a wireless network. Therefore, network configuration efficiency and a network configuration success rate can be improved, and user experience can be improved.

In a possible design, the first network is an open network.

According to another aspect, an embodiment of this application provides a network access method, including: establishing, by an access point, a first network connection between the access point and an intelligent device; receiving, by the access point, a first device identifier sent by the intelligent device; receiving, by the access point, n device identifiers sent by a server, where n is a positive integer; and if the first device identifier matches the n device identifiers, sending, by the access point, a network identifier and a password of the access point to the intelligent device by using the first network connection.

According to another aspect, an embodiment of this application provides a network access method, including: sending, by an intelligent device, a first network connection request to an access point; after establishing a first network connection between the intelligent device and the access point, receiving, by the intelligent device by using the first network connection, a network identifier and a password sent by the access point; and sending, by the intelligent device, a second network connection request to the access point based on the network identifier and the password.

According to another aspect, an embodiment of this application provides a network access method, where a server stores a mapping relationship between an account and network configuration parameters, the network configuration parameters include an access point, a room identifier, and n device identifiers corresponding to the room identifier, and n is a positive integer; and the method includes: receiving, by the server, a room identifier sent by user equipment by using a login account; and sending, by the server to an access point corresponding to the room identifier, device identifiers of n intelligent devices corresponding to the room identifier.

According to another aspect, an embodiment of this application provides a network access method, including: receiving, by a first access point, a third network identifier and a third password of a second access point that are sent by a server, where the first access point is a new access point replacing the second access point, where the server stores a mapping relationship between the first access point and network parameters of the second access point, network parameters include a network identifier and a password, and the network parameters of the second access point include the third network identifier and the third password; setting, by the first access point, a first network based on the third network identifier and the third password of the second access point before replacement; sending, by an intelligent device, a first network connection request to the first access point, where the first network connection request includes the third network identifier and the third password; establishing, by the first access point, a first network connection between the first access point and the intelligent device in response to the first network connection request; sending, by the first access point, a second network identifier and/or a second password of the first access point to the intelligent device by using the first network connection; and sending, by the intelligent device, a second network connection request to the first access point based on the second network identifier and/or the second password.

The solution may be applied to a scenario in which a router is replaced. The intelligent device may establish a communication channel between the intelligent device and the first access point by using a pre-connected network, and receive, by using the channel in point-to-point mode, a packet sent by the first access point, so that the intelligent device can obtain the network identifier and the password quickly and accurately by receiving only a few packets and access a wireless network. Therefore, network configuration efficiency and a network configuration success rate can be improved, and user experience can be improved.

In a possible design, the network parameters of the second access point further include n device identifiers, where n is a positive integer; before the sending, by the first access point, a second network identifier and a second password of the first access point to the intelligent device, the method further includes: sending, by the intelligent device, a first device identifier of the intelligent device to the first access point; forwarding, by the first access point, the first device identifier sent by the intelligent device to the server; and after the first device identifier matches the n device identifiers, instructing, by the server, the first access point to send the second network identifier and the second password of the first access point to the intelligent device; and the sending, by the first access point, a second network identifier and a second password of the first access point to the intelligent device includes: sending, by the first access point in response to the instruction of the server, the second network identifier and the second password of the first access point to the intelligent device.

In a possible design, the network parameters of the second access point further include n device identifiers, where n is a positive integer; and before the sending, by the first access point, a second network identifier and a second password of the first access point to the intelligent device, the method further includes: sending, by the intelligent device, a first device identifier of the intelligent device to the first access point; sending, by the server to the first access point, the n device identifiers corresponding to the second access point; and after the first device identifier matches the n device identifiers, sending, by the first access point, the second network identifier and the second password of the first access point to the intelligent device.

In a possible design, the first network is an open network.

According to another aspect, another embodiment of this application provides a network access method, including: receiving, by a first access point, a third network identifier and a third password of a second access point that are sent by a server, where the third network identifier and the third password are network parameters before modification by the first access point, a second network identifier and a second password are network parameters after modification by the first access point, and the network parameters before modification by the first access point and the network parameters after modification by the first access point may be completely different or partially different; setting, by the first access point, a first network based on the third network identifier and the third password of the second access point before replacement; and after establishing a first network connection between the first access point and an intelligent device, sending, by the first access point, the second network identifier and/or the second password of the first access point to the intelligent device by using the first network connection.

The solution may be applied to a scenario in which a network identifier and/or a password of an access point are/is modified. The intelligent device may establish a communication channel between the intelligent device and the access point by using a pre-connected network, and receive, by using the channel in point-to-point mode, a packet sent by the access point, so that the intelligent device can obtain the network identifier and the password quickly and accurately by receiving only a few packets and access a wireless network. Therefore, network configuration efficiency and a network configuration success rate can be improved, and user experience can be improved.

In a possible design, before the sending, by the first access point, the second network identifier and the second password of the first access point to the intelligent device, the method further includes: receiving, by the first access point, a first device identifier of the intelligent device that is sent by the intelligent device; and forwarding, by the first access point, the first device identifier sent by the intelligent device to the server, where the first device identifier is used by the server to determine whether n device identifiers corresponding to the second access point are matched, where n is a positive integer; and the sending, by the first access point, the second network identifier and the second password of the first access point to the intelligent device by using the first network connection includes: sending, by the first access point in response to an instruction of the server, the second network identifier and the second password of the first access point to the intelligent device by using the first network connection.

In a possible design, before the sending, by the first access point, the second network identifier and the second password of the first access point to the intelligent device, the method further includes: receiving, by the first access point, a first device identifier of the intelligent device that is sent by the intelligent device; receiving, by the first access point, n device identifiers corresponding to the second access point and sent by the server, where n is a positive integer; and after the first device identifier matches the n device identifiers, sending, by the first access point, the second network identifier and the second password of the first access point to the intelligent device.

According to another aspect, an embodiment of this application provides a network access method, including: sending, by an intelligent device, a first network connection request to a first access point, where the first network connection request includes a third network identifier and a third password; receiving, by the intelligent device, a second network identifier and/or a second password of the first access point sent by the first access point; and sending, by the intelligent device, a second network connection request to the first access point based on the second network identifier and/or the second password.

In a possible design, before the receiving, by the intelligent device, a second network identifier and/or a second password of the first access point sent by the first access point, the method further includes: sending, by the intelligent device, a first device identifier of the intelligent device to the first access point.

According to another aspect, an embodiment of this application provides a network access method, where a server stores a mapping relationship between a first access point and network configuration parameters of a second access point, the network configuration parameters of the second access point include a third network identifier, a third password, and n device identifiers, and n is a positive integer; and the method includes: sending, by the server, the third network identifier and the third password of the second access point to the first access point; and sending, by the server to the first access point, the n device identifiers corresponding to the second access point, where n is a positive integer and the n device identifiers are used by the first access point to determine whether a first device identifier matches the n device identifiers.

According to another aspect, an embodiment of this application provides a network access method, including: setting, by a first access point, a first network based on a third network identifier and a third password, where the third network identifier and the third password are network parameters before modification by the first access point, a second network identifier and a second password are network parameters after modification by the first access point, and the network parameters before modification by the first access point and the network parameters after modification by the first access point may be completely different or partially different; sending, by an intelligent device, a first network connection request to the first access point, where the first network connection request includes the third network identifier and the third password; establishing, by the first access point, a first network connection between the first access point and the intelligent device in response to the first network connection request; sending, by the first access point, the second network identifier and/or the second password of the first access point to the intelligent device by using the first network connection; and sending, by the intelligent device, a second network connection request to the first access point based on the second network identifier and/or the second password.

In a possible design, the sending, by the first access point, the second network identifier and/or the second password of the first access point to the intelligent device by using the first network connection includes: when only the password of the first access point is modified, sending, by the first access point, the second password of the first access point to the intelligent device by using the first network connection; or when only the network identifier of the first access point is modified, sending, by the first access point, the second network identifier of the first access point to the intelligent device by using the first network connection; or when the network identifier and the password of the first access point are modified, sending, by the first access point, the second network identifier and the second password of the first access point to the intelligent device by using the first network connection.

According to another aspect, an embodiment of this application provides a network access method, including: setting, by a first access point, a first network based on a third network identifier and a third password, where the third network identifier and the third password are network parameters before modification by the first access point, a second network identifier and a second password are network parameters after modification by the first access point, and the network parameters before modification by the first access point and the network parameters after modification by the first access point may be completely different or partially different; and after establishing a first network connection between the first access point and an intelligent device, sending, by the first access point, the second network identifier and/or the second password of the first access point to the intelligent device by using the first network connection.

In a possible design, the sending, by the first access point, the second network identifier and/or the second password of the first access point to the intelligent device by using the first network connection includes: when only the password of the first access point is modified, sending, by the first access point, the second password of the first access point to the intelligent device by using the first network connection; or when only the network identifier of the first access point is modified, sending, by the first access point, the second network identifier of the first access point to the intelligent device by using the first network connection; or when the network identifier and the password of the first access point are modified, sending, by the first access point, the second network identifier and the second password of the first access point to the intelligent device by using the first network connection.

According to another aspect, an embodiment of this application provides a network access method, where a server stores a mapping relationship between a first access point and network configuration parameters of a second access point, the network configuration parameters of the second access point include a third network identifier, a third password, and n device identifiers, and n is a positive integer; and the method includes: sending, by the server, the third network identifier and the third password of the second access point to the first access point; receiving, by the server, a first device identifier of an intelligent device that is sent by the first access point; and after the first device identifier matches the n device identifiers, instructing, by the server, the first access point to send a second network identifier and a second password of the first access point to the intelligent device.

According to another aspect, an embodiment of this application provides an access point, including one or more processors and one or more memories, where the one or more memories are coupled to the one or more processors, the one or more memories are configured to store computer program code, the computer program code includes a computer instruction, and when the one or more processors execute the computer instruction, the access point performs the foregoing network access method.

According to another aspect, an embodiment of this application provides a computer storage medium, including a computer instruction, where when the computer instruction is run on an access point, the access point is enabled to perform the foregoing network access method.

According to another aspect, an embodiment of this application provides a computer program product, where when the computer program product is run on a computer, the computer is enabled to perform the network access method performed by the foregoing access point.

According to another aspect, an embodiment of this application provides an intelligent device, including one or more processors and one or more memories, where the one or more memories are coupled to the one or more processors, the one or more memories are configured to store computer program code, the computer program code includes a computer instruction, and when the one or more processors execute the computer instruction, the intelligent device performs the foregoing network access method.

According to another aspect, an embodiment of this application provides a computer storage medium, including a computer instruction, where when the computer instruction is run on an intelligent device, the intelligent device is enabled to perform the foregoing network access method.

According to another aspect, an embodiment of this application provides a computer program product, where when the computer program product is run on a computer, the computer is enabled to perform the network access method performed by the foregoing intelligent device.

According to another aspect, an embodiment of this application provides user equipment, including one or more processors and one or more memories, where the one or more memories are coupled to the one or more processors, the one or more memories are configured to store computer program code, the computer program code includes a computer instruction, and when the one or more processors execute the computer instruction, the user equipment performs the foregoing network access method.

According to another aspect, an embodiment of this application provides a computer storage medium, including a computer instruction, where when the computer instruction is run on user equipment, the user equipment is enabled to perform the foregoing network access method.

According to another aspect, an embodiment of this application provides a computer program product, where when the computer program product is run on a computer, the computer is enabled to perform the network access method performed by the foregoing user equipment.

According to another aspect, an embodiment of this application provides a server, including one or more processors and one or more memories, where the one or more memories are coupled to the one or more processors, the one or more memories are configured to store computer program code, the computer program code includes a computer instruction, and when the one or more processors execute the computer instruction, the server performs the foregoing network access method.

According to another aspect, an embodiment of this application provides a computer storage medium, including a computer instruction, where when the computer instruction is run on a server, the server is enabled to perform the foregoing network access method.

According to another aspect, an embodiment of this application provides a computer program product, where when the computer program product is run on a computer, the computer is enabled to perform the network access method performed by the foregoing server.

According to another aspect, an embodiment of this application provides a chip, including a processor and a memory, where the memory is configured to store a computer-executable instruction, the processor is connected to the memory, and when the chip runs, the processor executes the computer-executable instruction stored in the memory, so that the chip performs the network access method.

According to another aspect, an embodiment of this application provides a system, including an access point, an intelligent device, user equipment, and a server, where the access point, the intelligent device, the user equipment, and the server are configured to perform the network access method in the foregoing aspect.

According to another aspect, an embodiment of this application provides a system, including an access point, an intelligent device, and user equipment, where the access point, the intelligent device, and the user equipment are configured to perform the network access method in the foregoing aspect.

According to another aspect, an embodiment of this application provides a system, including an access point, user equipment, and a server, where the access point, the user equipment, and the server are configured to perform the network access method in the foregoing aspect.

DESCRIPTION OF EMBODIMENTS

A wireless network in embodiments of this application may be a WIFI network, a Bluetooth (bluetooth) network, a zigbee (zigbee) network, an infrared network, or the like, and may be applied to a plurality of scenarios such as a household life and an office. In a smart household scenario, an intelligent device accesses a wireless network such as WIFI, so that a user can use, manage, and control the intelligent device by using the wireless network such as WIFI. Therefore, convenience is provided for the user's life. For example, when an intelligent socket accesses a WIFI network, a switch of the intelligent socket may be operated by using a mobile phone, so that the user can perform remote control, timing, and management on a home appliance (for example, an air conditioner, a water heater, an electric fan, or a coffee machine) powered by the intelligent socket.

Figure 1:
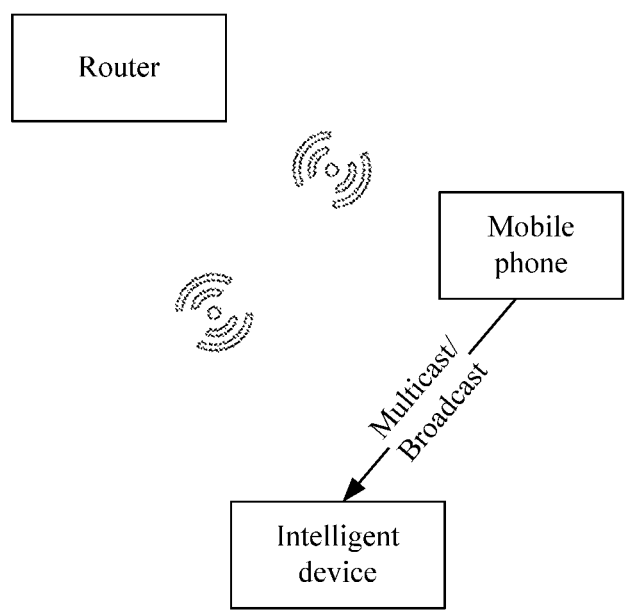
FIG. 1 is a schematic diagram of a network configuration process according to the prior art.
Figure 2:
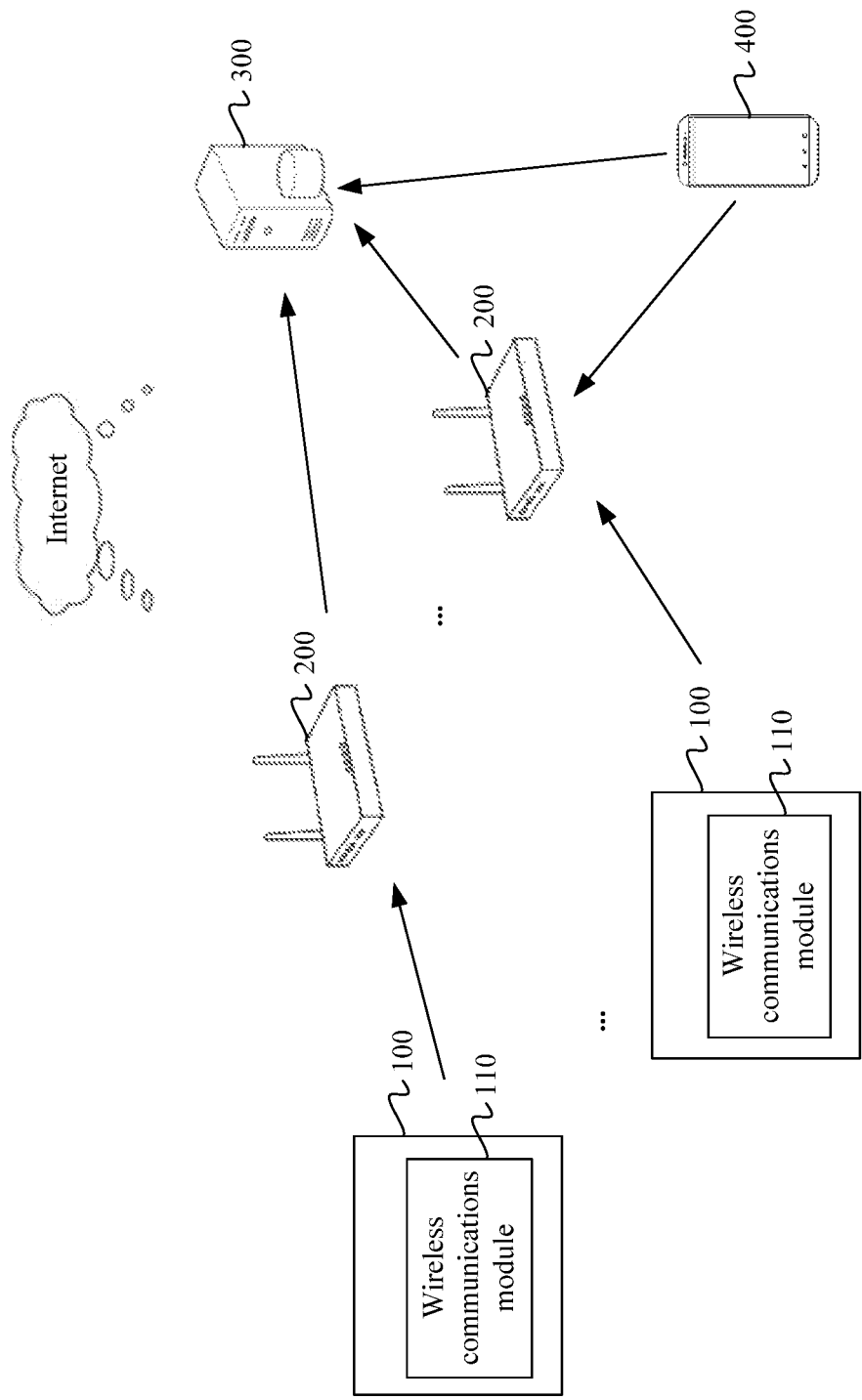
FIG. 2 is an architecture diagram of a system according to an embodiment of this application.

For a wireless network architecture in a smart household scenario in an embodiment of this application, refer to FIG. 2. As shown in FIG. 2, an intelligent device 100 includes a wireless communications module 110; at least one intelligent device 100 may access, by using the Internet of Things (internet of things, IOT) cloud server 300 and user equipment 400, a wireless network enabled by an access point (access point, AP) 200, to communicate with another device such as the server 300; the access point 200 may be connected to the Internet by using a WAN interface, to communicate with the server 300; the user equipment 400 may communicate with the server 300 by using the wireless network enabled by the access point 200, or a GPRS cellular network, or the like; and the server 300 maintains related configuration information of the wireless network, and may manage and control a network configuration process of the wireless network. The network configuration information may include a correspondence between the access point and the wireless network enabled by the access point. In addition, in this embodiment of this application, "the intelligent device 100 accesses the wireless network enabled by the access point 200" may also be referred to as "the intelligent device accesses the access point 200".

The intelligent device 100 in FIG. 2 may be an electronic device supporting a wireless network protocol of the Internet of Things such as WIFI (802.11), Bluetooth (bluetooth 4.x), zigbee (802.15.4), or infrared, for example, may be a terminal, a portable device, a wearable device, or a hand-held device. Specifically, the intelligent device may be an electronic device having a user input interface, or may be an electronic device having no user input interface. This is not limited in this embodiment of this application. For example, the intelligent device 100 may be specifically an intelligent lamp, an intelligent socket, an intelligent switch, an intelligent camera, an intelligent door status switch, an intelligent smoke sensor, an intelligent set top box, an intelligent curtain, or the like in a smart household.

The access point 200 may implement mutual conversion between a wireless network protocol such as WIFI, Bluetooth, or zigbee and the Internet Protocol (internet protocol, IP), and may forward a radio signal to the nearby intelligent device 100 by using an antenna, so that the intelligent device 100 can perform communication by using the wireless network such as WIFI. For example, the access point 200 may be specifically a router, a bridge, or a Bluetooth gateway.

The user equipment 400 may be configured to assist the intelligent device 100 in performing network configuration, and may be specifically any terminal that has a file sharing function, such as a mobile phone, a tablet computer, a wearable device, a vehicle-mounted device, an augmented reality (augmented reality, AR) or virtual reality (virtual reality, VR) device, a notebook computer, an ultra-mobile personal computer (ultra-mobile personal computer, UMPC), a netbook, or a personal digital assistant (personal digital assistant, PDA). This is not limited in this embodiment of this application.

Figure 3:
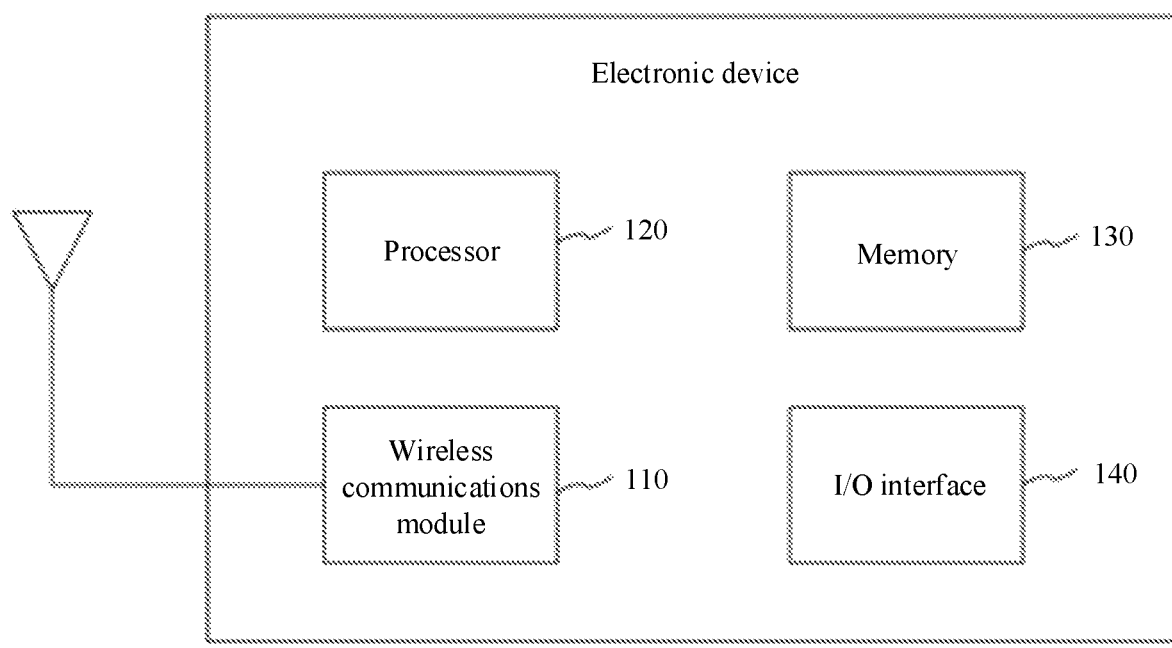
FIG. 3 is a schematic structural diagram of an electronic device according to an embodiment of this application.

FIG. 3 is a schematic structural diagram of an electronic device according to an embodiment of this application. The electronic device may be the intelligent device 110, the access point 200, the server 300, or the user equipment 400 in FIG. 2. As shown in FIG. 3, the electronic device may include one or more of a wireless communications module 110, a processor 120, a memory 130, an I/O (input/output) interface 140, and an antenna 150.

The memory 130 may be configured to store data, a software program, and a module, and may be a volatile memory (volatile memory), for example, a random access memory (random access memory, RAM), or a non-volatile memory (non-volatile memory), for example, a read-only memory (read-only memory, ROM), a flash memory (flash memory), a hard disk drive (hard disk drive, HDD), or a solid-state drive (solid-state drive, SSD), or a combination of the foregoing types of memories. Specifically, the memory 130 may store program code, where the program code is used to enable the processor 120 to perform a network configuration method according to an embodiment of this application by executing the program code.

The memory 130 may include a high-speed read/write memory configured to store a program and data in an operation period of the electronic device, and a permanent memory configured to store a required instruction and data. The memory 130 stores data to be sent from the electronic device and data received by the electronic device.

The I/O interface 140 corresponds to one or more components configured to communicate with another device in a wireless manner. The I/O interface 140 may include a wired network interface such as an IEEE 802.3 Ethernet interface and/or a wireless interface such as an IEEE 802.11 WIFI interface.

The wireless communications module 110 may include one or more of a WIFI module, a Bluetooth module, an infrared module, and a GPRS module, and may be configured to receive and transmit information, and may further transmit received information to the processor 120 for processing, or transmit a signal generated by the processor 120. Specifically, the wireless communications module 110 may transmit and receive signals by using the I/O interface 140 and the antenna 150.

The processor 120 is coupled to the data wireless communications module 110, the memory 130, and the I/O interface 140. The processor 120 may be any processing device, including but not limited to a microprocessor without interlocked piped stages (microprocessor without interlocked piped stages, MIPS)-level processor, a microprocessor, a digital signal processor, a dedicated integrated circuit, a microcontroller, a state machine, or a programmable logic array of any type. The processor 120 is a control center of the electronic device. The processor uses various interfaces and lines to connect each part of the entire electronic device, and by running or executing the software program and/or module stored in the memory 130, and invoking the data stored in the memory 130, executes various functions of the electronic device and processes the data.

In addition, it should be noted, the structure shown in FIG. 3 does not constitute a limitation on the structure of the electronic device in this embodiment of this application. The electronic device may further include other modules, for example, a sensor and a power module, which are not exhaustively described herein.

A network access method, a device, and a system provided by the embodiments of this application are hereinafter described in detail based on the network architecture shown in FIG. 2 and by using an example in which a wireless network is a WIFI network.

An embodiment of this application provides a network access method. The method may be applied to a system, and the system may include an intelligent device, an access point, user equipment, and a server. For a main procedure of the method, refer to FIG. 4.

Step 101 specifically includes: an intelligent device sends a first network connection request to a first access point.

The intelligent device sends the first network connection request to the first access point, to request to access a first network.

Step 102 specifically includes: the first access point establishes a first network connection between the first access point and the intelligent device in response to the first network connection request.

When a wireless network is a WIFI network, a WIFI network connection may be established between the intelligent device and the access point based on the 802.11 protocol. Specifically, in a WIFI network access procedure, the intelligent device sends a probe request (probe request) to the access point; the access point sends a probe response (probe response) to the intelligent device; then the intelligent device sends an authentication request (authentication request) to the access point; the access point may send an authentication response (authentication response) to the intelligent device; the intelligent device sends an association request (association request) to the access point; and the access point sends an association response (association response) to the intelligent device, to establish a network connection between the intelligent device and the access point. In this embodiment of this application, the first network connection request in step 101 may include at least one of the probe request, the authentication request, or the association request.

In the steps 101 and 102, the intelligent device may access the first WIFI network by using the first network connection request, where the first WIFI network may be referred to as a pre-connected network. In some embodiments, the intelligent device accessing the pre-connected network may access the first access point in the pre-connected network, but does not have a right to access an external network by using a WAN interface of the first access point.

In a possible implementation, the intelligent device accessing the pre-connected network does not have a right to access another network device in the pre-connected network either.

Therefore, the intelligent device accessing the pre-connected network of the first access point may access the first access point. To be specific, the intelligent device establishes a communication channel between the intelligent device and the first access point by accessing the pre-connected network.

Specifically, the first network connection request may include a network identifier (which may be, for example, an SSID) and a password of the pre-connected network. The network identifier of the pre-connected network may be a preset network identifier. For example, the first network identifier may be "yulianjie"; or the first network identifier may be named in a preset manner. For example, a start of the first network identifier may be identified by using "YLJ" characters, or a start of the first network identifier may be identified by using "manufacturer"+"YLJ", to indicate that the network identifier is the network identifier of the pre-connected network, and distinguish from a network identifier of another WIFI network.

In a specific implementation, the pre-connected network may be an open network, and the intelligent device may quickly access the pre-connected network of the first access point without password verification by the first access point. In another specific implementation, a preset password (which may be, for example, 123456 or 000000) may also be set for the pre-connected network, and the first network connection request may also include the preset password. Therefore, the pre-connected network of the first access point is accessed based on the preset network identifier and the preset password. When the intelligent device has no user input component, and a user cannot enter information on the intelligent device, the intelligent device may access the pre-connected network directly, quickly, and efficiently by using the preset network identifier.

In a possible implementation, the intelligent device may find a network identifier of a pre-connected network that is broadcast by one or more access points. After a network identifier of a pre-connected network that is found by the intelligent device matches that stored by the intelligent device, the intelligent device may send the first network connection request to the first access point corresponding to the network identifier, to request to access the pre-connected network.

In addition, after accessing the pre-connected network, the intelligent device may trigger first notification information to notify the user that the intelligent device has accessed the pre-connected network. For example, after the intelligent device accesses the pre-connected network, an indicator of the intelligent device may flash continuously for several times to notify the user that the intelligent device has accessed the pre-connected network. Alternatively, after accessing the pre-connected network, the intelligent device may generate a "long beep" to notify the user that the intelligent device has accessed the pre-connected network. The foregoing is only an example of the first notification information for description, and the first notification information may also be in another form. This is not limited in this embodiment of this application.

Step 103 specifically includes: the intelligent device sends a first device identifier of the intelligent device to the first access point.

The device identifier of the intelligent device is used to identify an identity of the intelligent device. For example, the device identifier may be a serial number, a QR code, a barcode, a radio frequency identification (radio frequency identification, RFID) tag, an RFC, an SSID broadcast by a WIFI chip of the intelligent device, or a MAC address of the intelligent device. A form of the device identifier is not specifically limited in this embodiment of this application.

The intelligent device may further send its first device identifier to the first access point. There is no definite sequence of sending the first device identifier and sending the first network connection request by the intelligent device to the first access point. The intelligent device may send the first device identifier before sending the first network connection request. For example, the intelligent device sends the first device identifier to the first access point in broadcast mode during power-on. Alternatively, the intelligent device may send the first device identifier after sending the first network connection request. For example, after establishing the first network connection between the intelligent device and the first access point, the intelligent device may send the first device identifier to the first access point by using the first network connection. Alternatively, the intelligent device may send the first network connection request and the first device identifier in a same message to the first access point. This is not limited in this embodiment of this application.

Step 104 specifically includes: the first access point forwards the first device identifier received from the intelligent device to a server.

In a smart household scenario, there are a large quantity of intelligent devices, and there are also a large quantity of pre-connection channels between the intelligent devices and the access point. A pre-connection channel between each intelligent device and the first access point may be marked with a device identifier of the intelligent device. After receiving the first device identifier sent by the intelligent device, the first access point may forward the first device identifier sent by the intelligent device to the server, to notify the server that the intelligent device has established a pre-connection channel between the intelligent device and the first access point.

Step 105 specifically includes: user equipment obtains the first device identifier of the intelligent device, and sends the first device identifier to the server.

The user equipment side generally needs to obtain the first device identifier of the intelligent device only through a manual operation of the user. For example, referring to FIG. 6, when the user equipment is a mobile phone, the user may log in to the server by using an app of the mobile phone (for example, a smart household app), and send the first device identifier of the intelligent device to the server by using a WIFI network or a GPRS network after obtaining the first device identifier of the intelligent device.

Figure 7:
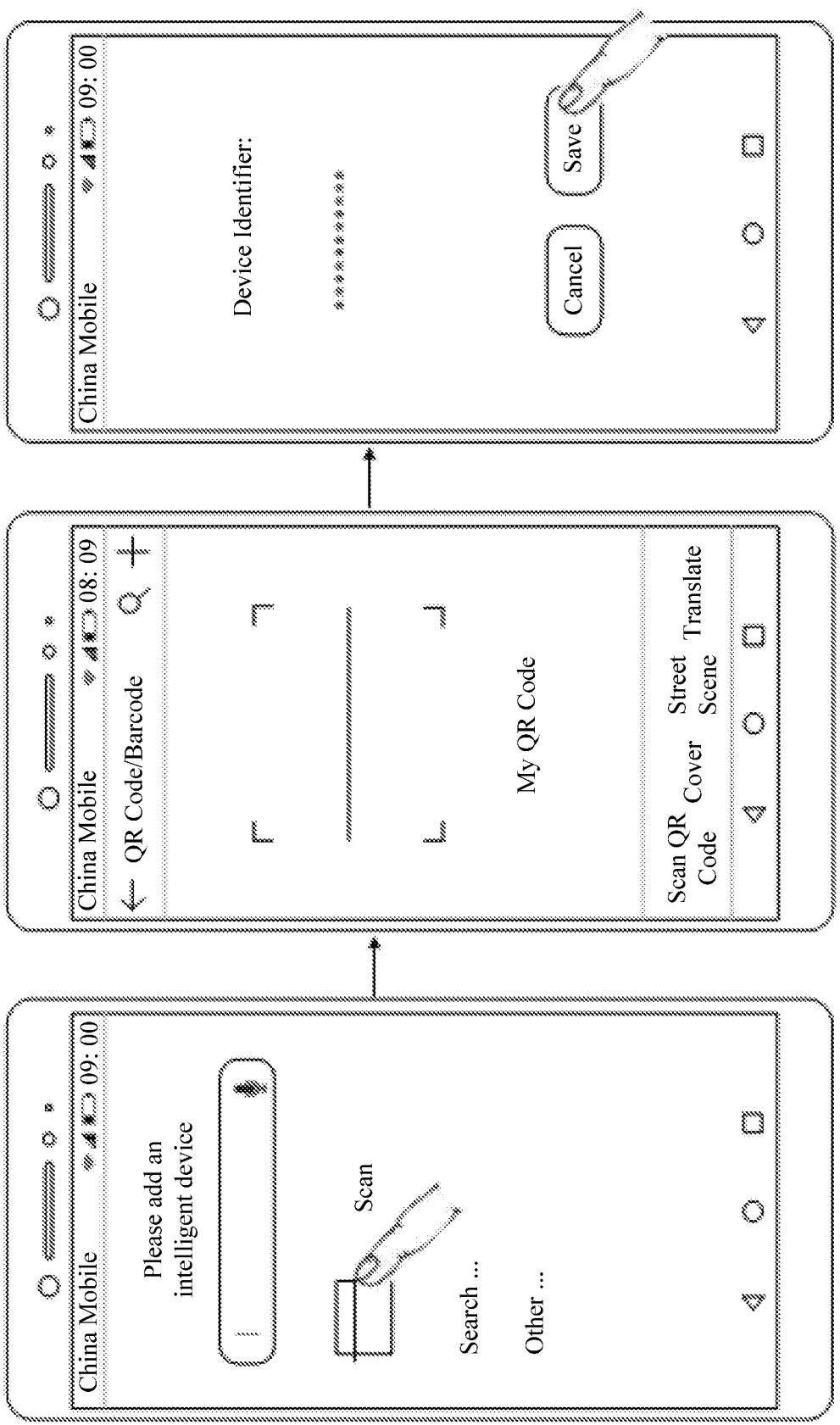
FIG. 7 is another schematic diagram of an interface display of user equipment according to an embodiment of this application.

For example, referring to FIG. 7, the user may scan a QR code or a two-dimensional barcode on a body of the intelligent device or a packing case, in an instruction for use, or the like by using an app of the mobile phone, to obtain the first device identifier, and therefore send the first device identifier to the server, so that the server performs network configuration for the intelligent device based on the first device identifier. In addition, after obtaining the first device identifier, referring to FIG. 7, the mobile phone may further save the first device identifier in response to an operation of tapping a "Save" button by the user.

Figure 8:
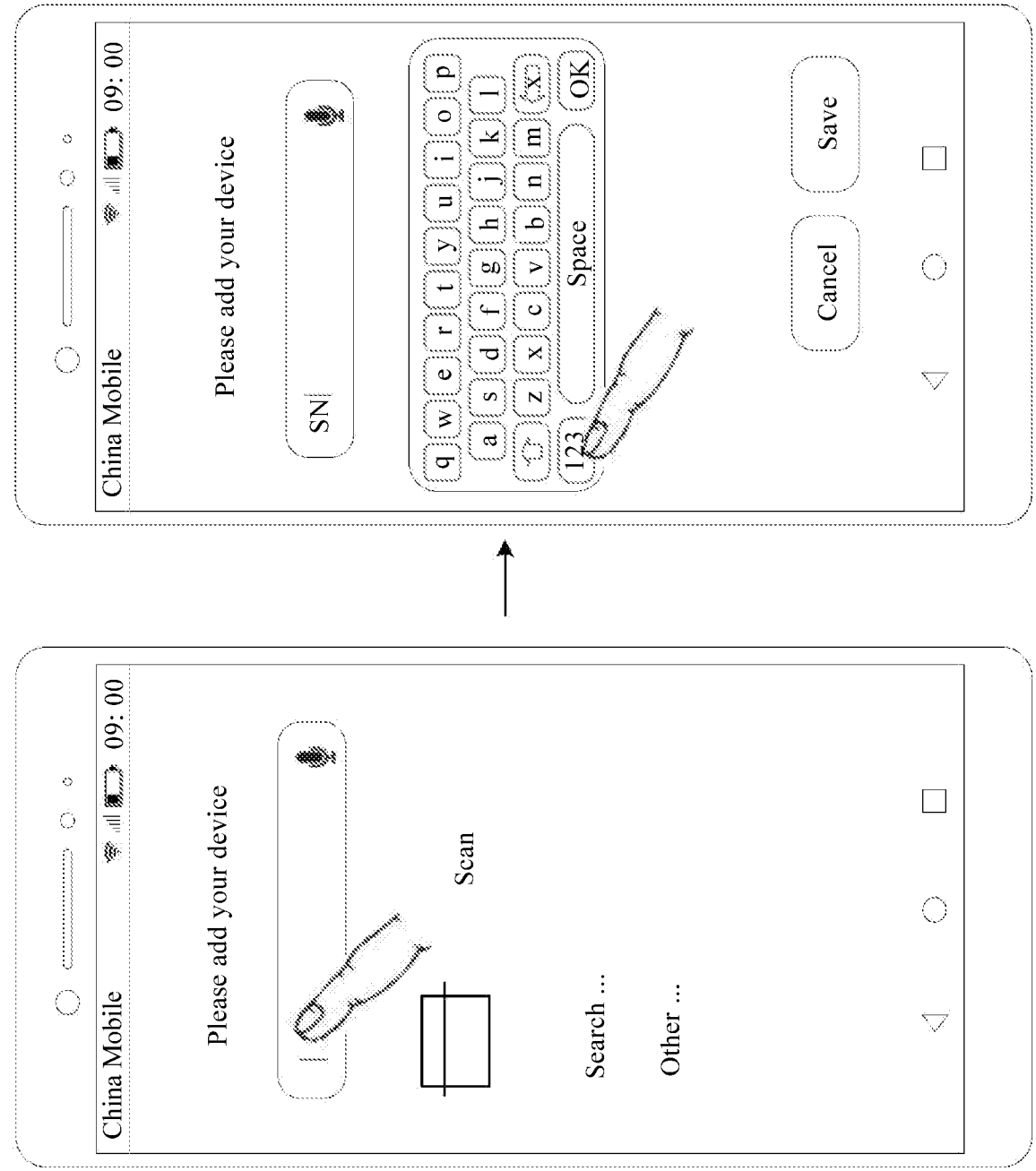
FIG. 8 is another schematic diagram of an interface display of user equipment according to an embodiment of this application.

Alternatively, referring to FIG. 8, the user may enter a serial number or a MAC address of the intelligent device by using an app of the mobile phone manually or using a voice, to obtain the first device identifier. After obtaining the first device identifier, the mobile phone may send the first device identifier to the server in response to an operation of tapping a "Save" button by the user. In addition, the mobile phone itself may save the first device identifier.

Alternatively, the mobile phone may receive an SSID broadcast by the intelligent device, determine, in response to an operation of selecting the SSID of the intelligent device by the user, to use the SSID broadcast by the intelligent device as the first device identifier, and send the first device identifier to the server.

Step 106 specifically includes: after the first device identifier received from the user equipment matches the first device identifier received from the first access point, the server instructs the first access point to send a first network identifier and a first password of a second access point to the intelligent device.

When the server receives the first device identifier sent by the first access point, it may indicate that the pre-connection channel between the intelligent device and the first access point has been established, the intelligent device has prepared for network configuration, and network configuration may be performed for the intelligent device.

Because generally the user equipment side can obtain the first device identifier of the intelligent device only through a manual operation of the user, after the user equipment obtains the first device identifier and sends the first device identifier to the server, it may be considered that the intelligent device corresponding to the first device identifier is an intelligent device authenticated by the user. To be specific, the user agrees, allows, or indicates that network configuration can be performed for the intelligent device.

Therefore, when the server determines that the first device identifier sent by the user equipment matches the first device identifier sent by the first access point, the server may instruct the first access point to send the first network identifier and the first password corresponding to the second access point, to the intelligent device authenticated by the user and accessing the pre-connected network, so that the intelligent device accesses a WIFI network of the second access point based on the first network identifier and the first password.

The intelligent device authenticated by the user can receive the first network identifier and the first password only in this way, and therefore can access the WIFI network. However, an intelligent device not authenticated by the user cannot receive the first network identifier and the first password, and therefore cannot access the WIFI network. Therefore, this network configuration mode has relatively high security, and can prevent an insecure action of another intelligent device such as stealing a neighbor's Wi-Fi or malicious access of another device.

It should be noted that, in this embodiment of this application, the server is a global control device, and may be connected to access points in a plurality of families, to implement WIFI network configuration for intelligent devices in the plurality of families.

In an alternative solution to step 105 and step 106, the first access point may send a network configuration request of the intelligent device to the server in response to an instruction operation of the user; and the server instructs, in response to the network configuration request sent by the first access point, the first access point to send the first network identifier and the first password of the second access point to the intelligent device.

Figure 5:
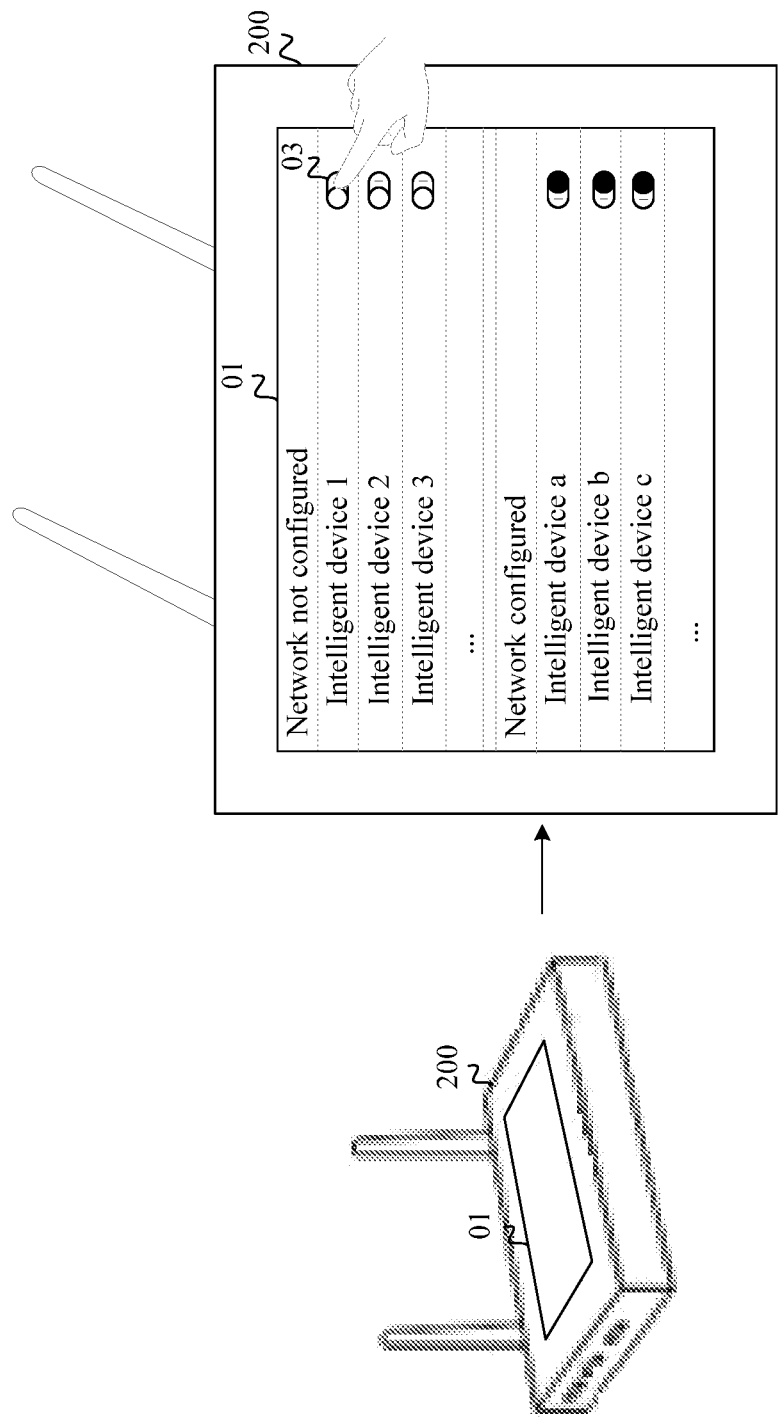
FIG. 5 is a schematic diagram of a device management interface according to an embodiment of this application.

For example, when the first access point is a router 200 in FIG. 2, the user may log in to a device management interface 01 of the router 200. Referring to FIG. 5, all intelligent devices accessing a pre-connected network of the router 200 are displayed on the device management interface 01. When the user turns on a network configuration switch 03 of an intelligent device (for example, an intelligent device 1) for which no network is configured (which has accessed the pre-connected network but has not accessed a WIFI network) on the device management interface 01, the router 200 sends a network configuration request of the intelligent device to the server, to request network configuration for the intelligent device. In addition, an intelligent device for which a network is configured (which has accessed the WIFI network) may be displayed on the device management interface 01. Alternatively, the user may log in to the device management interface 01 of the router 200 by using the user equipment such as a mobile phone, and by triggering a network configuration switch 03 of an intelligent device for which no network is configured, send a network configuration request of the intelligent device to the server.

The network configuration request sent by the first access point to the server may further include the first device identifier of the intelligent device. When the network configuration request of the intelligent device includes the first device identifier of the intelligent device, the foregoing step 104 may be further omitted in the network access method. Specifically, after the first access point establishes the first network connection between the first access point and the intelligent device, and receives the first device identifier sent by the intelligent device, the first access point may send the network configuration request of the intelligent device, where the network configuration request includes the first device identifier of the intelligent device.

Step 107 specifically includes: the first access point sends, in response to the instruction of the server, the first network identifier and the first password of the second access point to the intelligent device by using the first network connection.

After the intelligent device accesses the pre-connected network of the first access point, and establishes the communication channel between the intelligent device and the first access point, the intelligent device may negotiate an encryption/decryption mechanism with the first access point by using the communication channel. By using the pre-connected network and the negotiated encryption/decryption mechanism, the first access point may encrypt the first network identifier and the first password and send the encrypted first network identifier and first password to the intelligent device. By using the pre-connected network and the negotiated encryption/decryption mechanism, the intelligent device may obtain, through decryption, the first network identifier and the first password sent by the first access point. Because there is only a little information in the first network identifier and the first password, the first access point can send the encrypted first network identifier and first password to the intelligent device by using one or several packets, and the intelligent device can obtain the first network identifier and the first password by decrypting the one or several packets. Therefore, in comparison with the prior art in which it takes an intelligent device a relatively long time to receive dozens of or more packets to obtain an SSID and a password, in the method provided by this embodiment of this application, the network identifier and the password can be obtained more efficiently. Therefore, network configuration efficiency of the intelligent device can be improved.

In addition, in comparison with a multicast/broadcast mode in the prior art, in this embodiment of this application, after the intelligent device accesses the pre-connected network, the intelligent device may obtain an IP address; the first access point may send the first network identifier and the first password to the intelligent device based on the IP address in point-to-point communication mode. Therefore, transmission efficiency and accuracy of the first network identifier and the first password are both relatively high. Therefore, efficiency and accuracy of obtaining the first network identifier and the first password by the intelligent device are also both relatively high, and further, network configuration efficiency and success rate of the intelligent device are also relatively high.

As can be learned, in this embodiment of this application, the intelligent device establishes the communication channel between the intelligent device and the first access point by using the pre-connected network, where the channel may be used by the intelligent device to obtain the first network identifier and the first password from the first access point quickly and accurately, so that the intelligent device can access the WIFI network based on the first network identifier and the first password. To be specific, the pre-connected network prepares a network channel in advance for the intelligent device to obtain the network identifier and the password for accessing the WIFI network.

Step 108 specifically includes: after receiving the first network identifier and the first password sent by the first access point, the intelligent device sends a second network connection request to the second access point based on the first network identifier and the first password.

After receiving the first network identifier and the first password of the second access point, the intelligent device may send, in the second network connection request, the received first network identifier and first password to the second access point, to request to access a second network of the second access point, where the second network is a WIFI network. After receiving the first network identifier and the first password sent by the intelligent device, the second access point may perform password verification, and after successful verification, send an acknowledgement to the intelligent device, to notify that the intelligent device is allowed to access the second network of the access point. Different from the pre-connected network, the WIFI network accessed by the intelligent device may allow the intelligent device to normally access an external network and another device in the WIFI network.

In addition, after accessing the WIFI network, the intelligent device may trigger second notification information to notify the user that the intelligent device has accessed the WIFI network. For example, after the intelligent device accesses the WIFI network, the indicator of the intelligent device may be always on, to notify the user that the intelligent device has accessed the WIFI network. Alternatively, after accessing the WIFI network, the intelligent device may generate a "short beep" to notify the user that the intelligent device has accessed the WIFI network. The foregoing is only an example of the second notification information for description, and the second notification information may also be in another form. This is not limited in this embodiment of this application.

In addition, after accessing the second network of the second access point, the intelligent device may break the first network connection between the intelligent device and the first access point.

It should be noted that, in this embodiment of this application, the second access point may be the same as or different from the first access point. This is not limited in this embodiment of this application.

Figure 9:
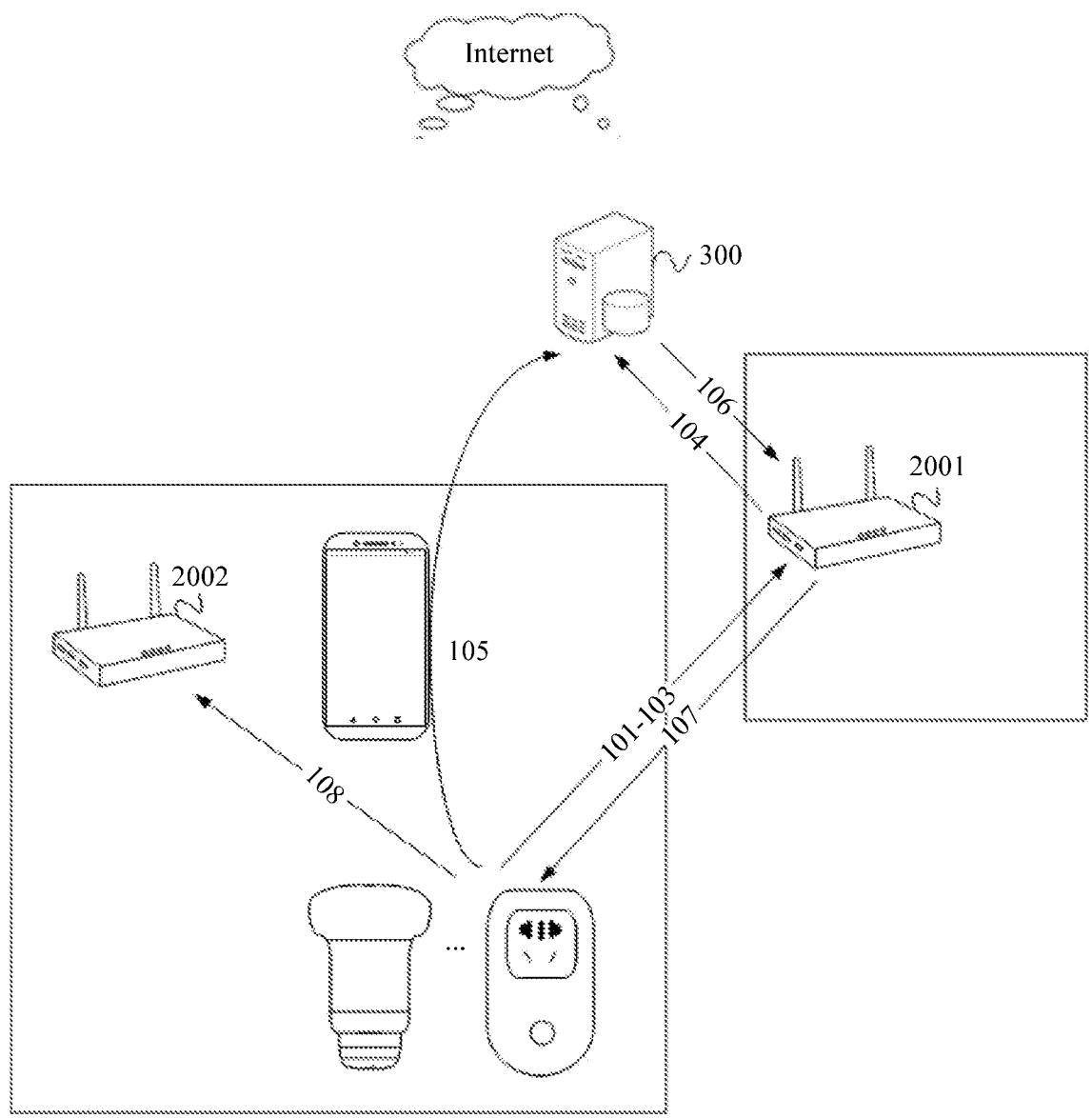
FIG. 9 is a flowchart of another network access method according to an embodiment of this application.

In a specific application scenario of this embodiment of this application, referring to FIG. 9, the first access point may be a router 2001 of a neighbor; the second access point may be a router 2002 of the user; and the intelligent device may be an intelligent device such as an intelligent lamp or an intelligent socket of the user. In the foregoing step 101 and step 102, the intelligent device such as the intelligent lamp or the intelligent socket may access a pre-connected network of the neighbor's router 2001; in the foregoing step 103, the intelligent device such as the intelligent lamp or the intelligent socket may send its own device identifier to the neighbor's router 2001; in the foregoing step 104, the neighbor's router 2001 sends the device identifier of the intelligent device such as the intelligent lamp or the intelligent socket to the server; in the foregoing step 105, the mobile phone obtains the device identifier of the intelligent device such as the intelligent lamp or the intelligent socket, and sends the device identifier to the server; in the foregoing step 106, the server may instruct the neighbor's router 2001 to send a network identifier and a password of the user's router 2002 to the intelligent device such as the intelligent lamp or the intelligent socket; in the foregoing step 107, the user's router 2002 sends its own network identifier and password to the intelligent device such as the intelligent lamp or the intelligent socket; and in the foregoing step 108, the intelligent device such as the intelligent lamp or the intelligent socket accesses a WIFI network of the user's router 2002 based on the received network identifier and password.

Figure 10:
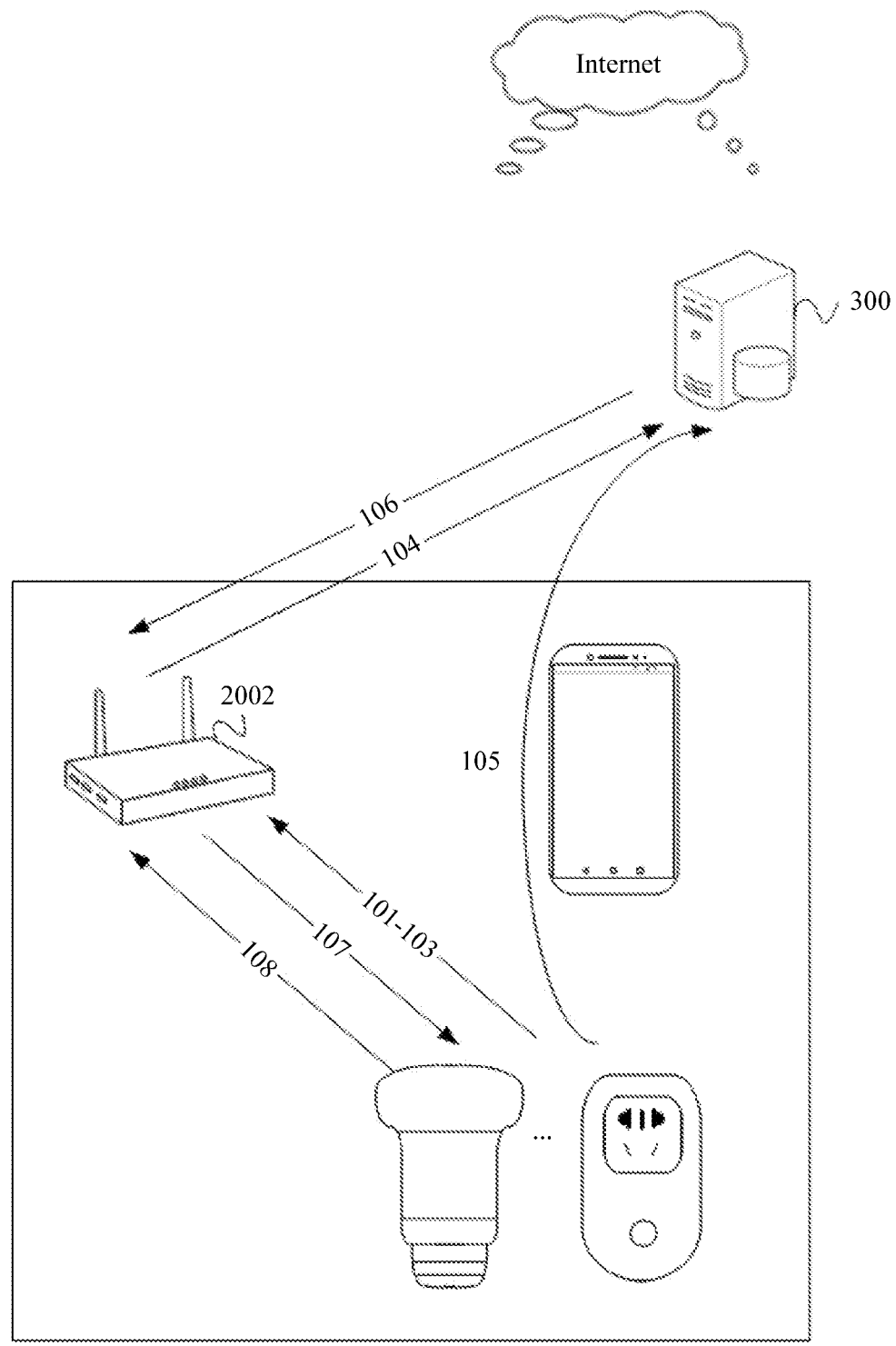
FIG. 10 is a flowchart of another network access method according to an embodiment of this application.

In another specific application scenario of this embodiment of this application, referring to FIG. 10, both the first access point and the second access point may be the user's router 2002; and a device of the user such as an intelligent lamp or an intelligent socket may first access a pre-connected network of the user's router 2002, and then receive a network identifier and a password of a WIFI network that are sent by the user's router 2002, and may further access the WIFI network of the user's router 2002.

As can be learned, in this embodiment of this application, the intelligent device may establish the communication channel between the intelligent device and the first access point by using the pre-connected network, obtain the first network identifier and the first password of the second access point from the first access point quickly and accurately by using the channel and only a few packets, and therefore access the WIFI network of the second access point based on the first network identifier and the first password. Therefore, the network configuration efficiency and network configuration success rate can be improved, and user experience can be improved.

That the server instructs the first access point to send a first network identifier and a first password corresponding to a second access point to the intelligent device in the foregoing step 106 may include a plurality of implementations.

For example, in a possible implementation, referring to Table 1, the server may store a first mapping relationship between an account and an access point. That the server instructs the first access point to send a first network identifier and a first password corresponding to a second access point to the intelligent device in the foregoing step 106 may include: the server sends, to the first access point, a network identifier and a password of the access point corresponding to the account, to instruct the first access point to send, to the intelligent device, the network identifier and the password of the access point corresponding to the account. The access point corresponding to the account is the second access point.

TABLE 1

| First mapping relationship | Account | Access point |
|---|---|---|
| First mapping relationship 1 | Account 1 | Access point 1 |
| First mapping relationship 2 | Account 2 | Access point 2 |
| ... | ... | ... |

Specifically, the first mapping relationship may include a device identifier of the access point, the network identifier and password of the access point, and the account. The device identifier of the access point may be a MAC address, a serial number, a QR code, or the like of the access point. The account may be a system account, a user name, or a mobile phone number for logging in to the server by the user, or a serial number allocated by the server, or the like. Specific forms of the device identifier and the account are not limited in this embodiment of this application. In a smart household scenario, generally one account may correspond to one family, and generally one account may be bound with one access point. User equipment and an access point bound with one family account are devices in the family. Unless otherwise specified, hereinafter an example in which one account is bound with one access point is used for description.

Figure 6:
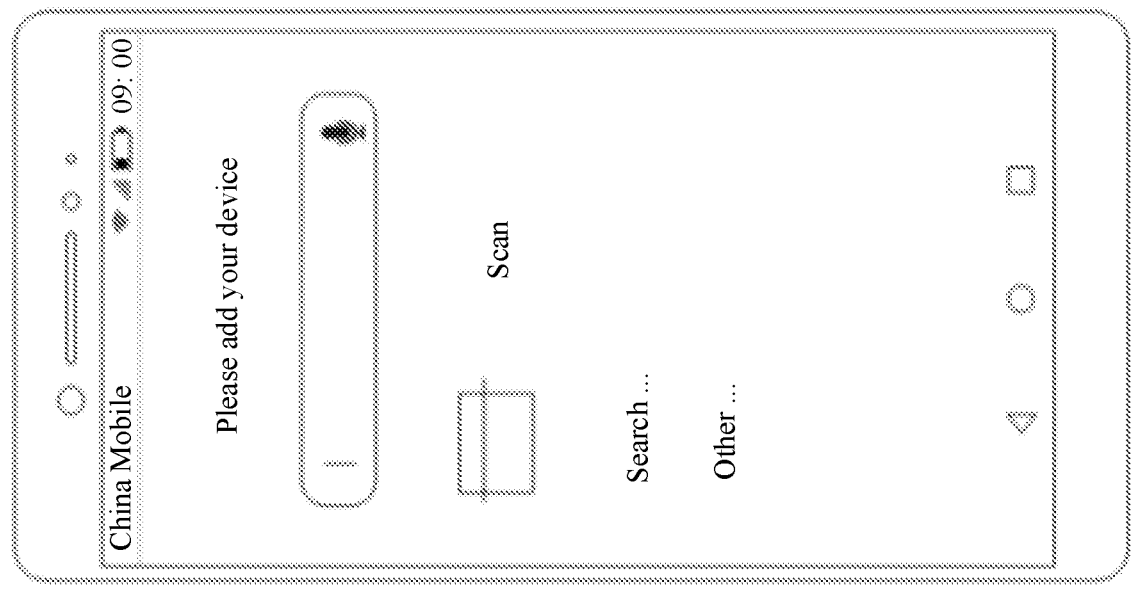
FIG. 6 is a schematic diagram of an interface display of user equipment according to an embodiment of this application.
Figure 6:
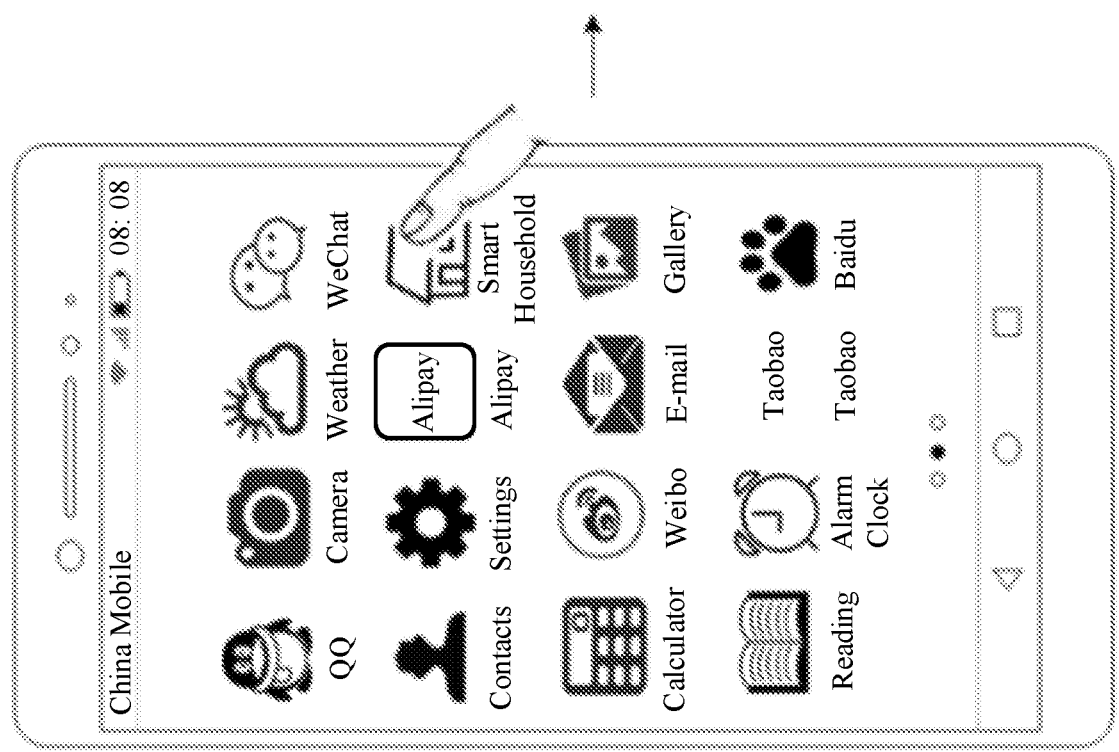
Figure 11A:
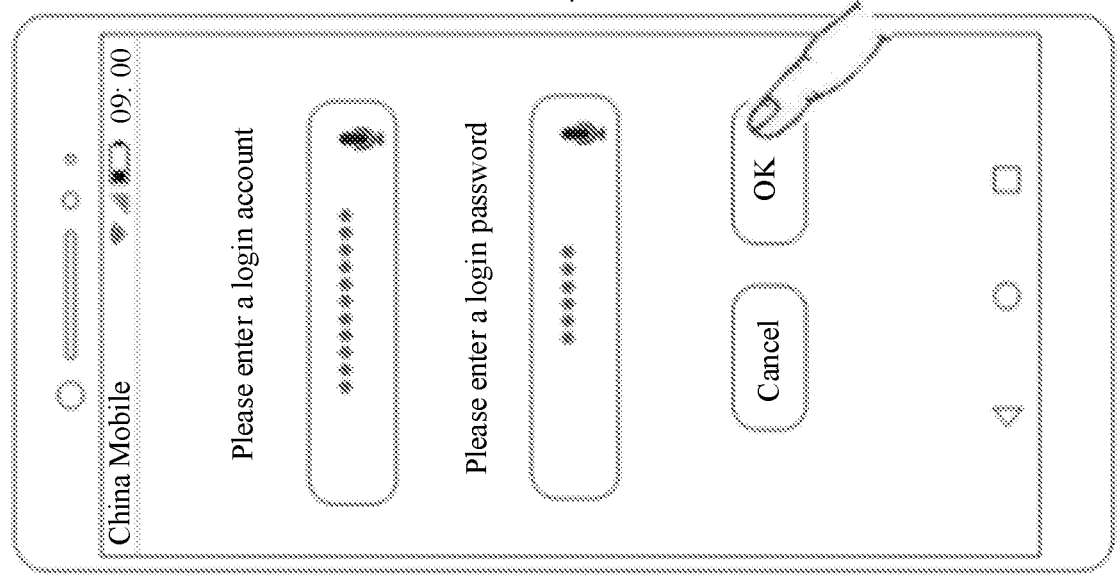
FIG. 11A and FIG. 11B are another schematic diagram of an interface display of user equipment according to an embodiment of this application.
Figure 11A:
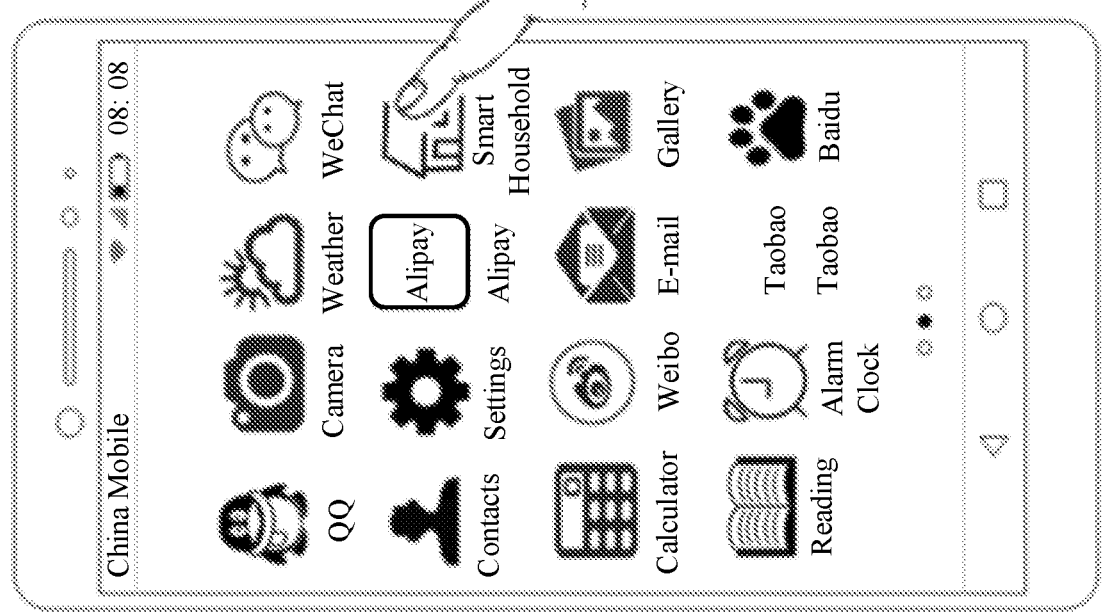
Figure 11B:
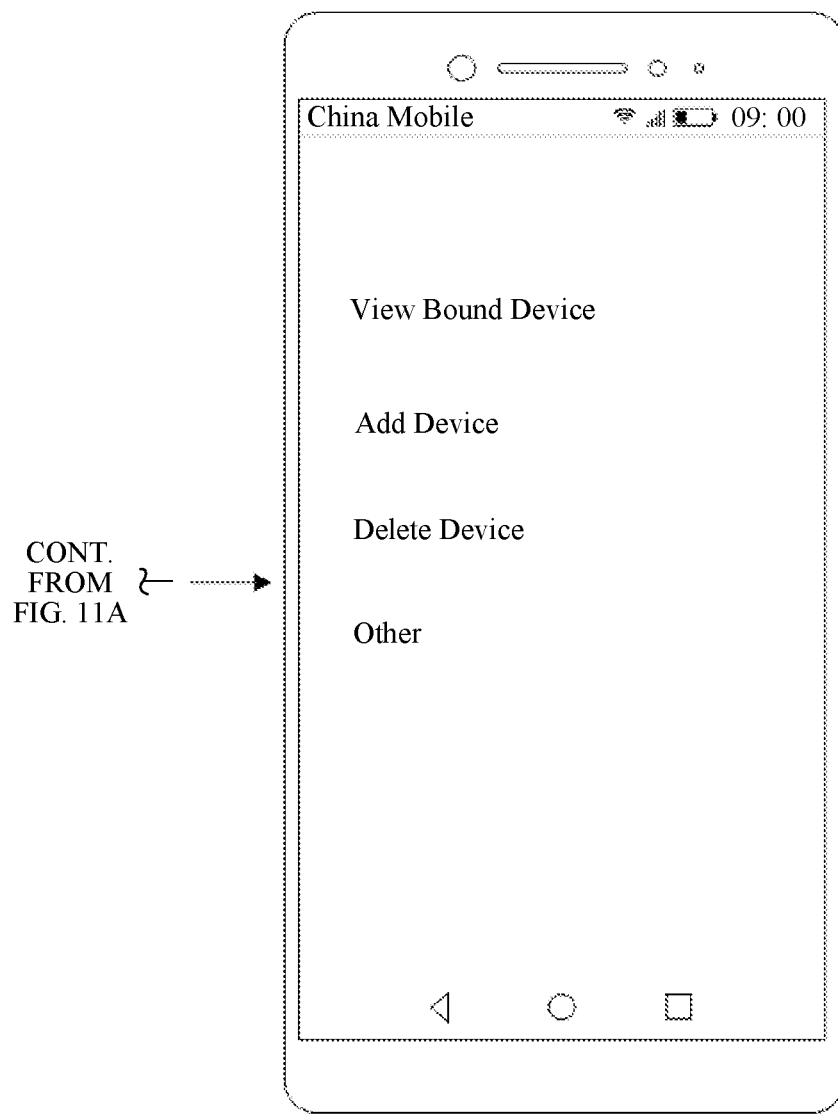

When a WIFI network is set for the first time (that is, when the WIFI network is enabled for the first time), the access point may be bound with the account by using the user equipment that logs in to the server by using the account. For example, if the user equipment is a mobile phone, referring to FIG. 11A and FIG. 11B, when an "Add Device" option in a third picture in FIG. 11A and FIG. 11B is tapped, a page for adding a device as shown in a second picture in FIG. 6 is displayed; and then, similarly to the method for adding an intelligent device as shown in FIG. 7 or FIG. 8, the mobile phone may add a device identifier of the access point, and may send the device identifier of the access point to the server, so that the server side saves a correspondence between the access point and the account.

Figure 12:
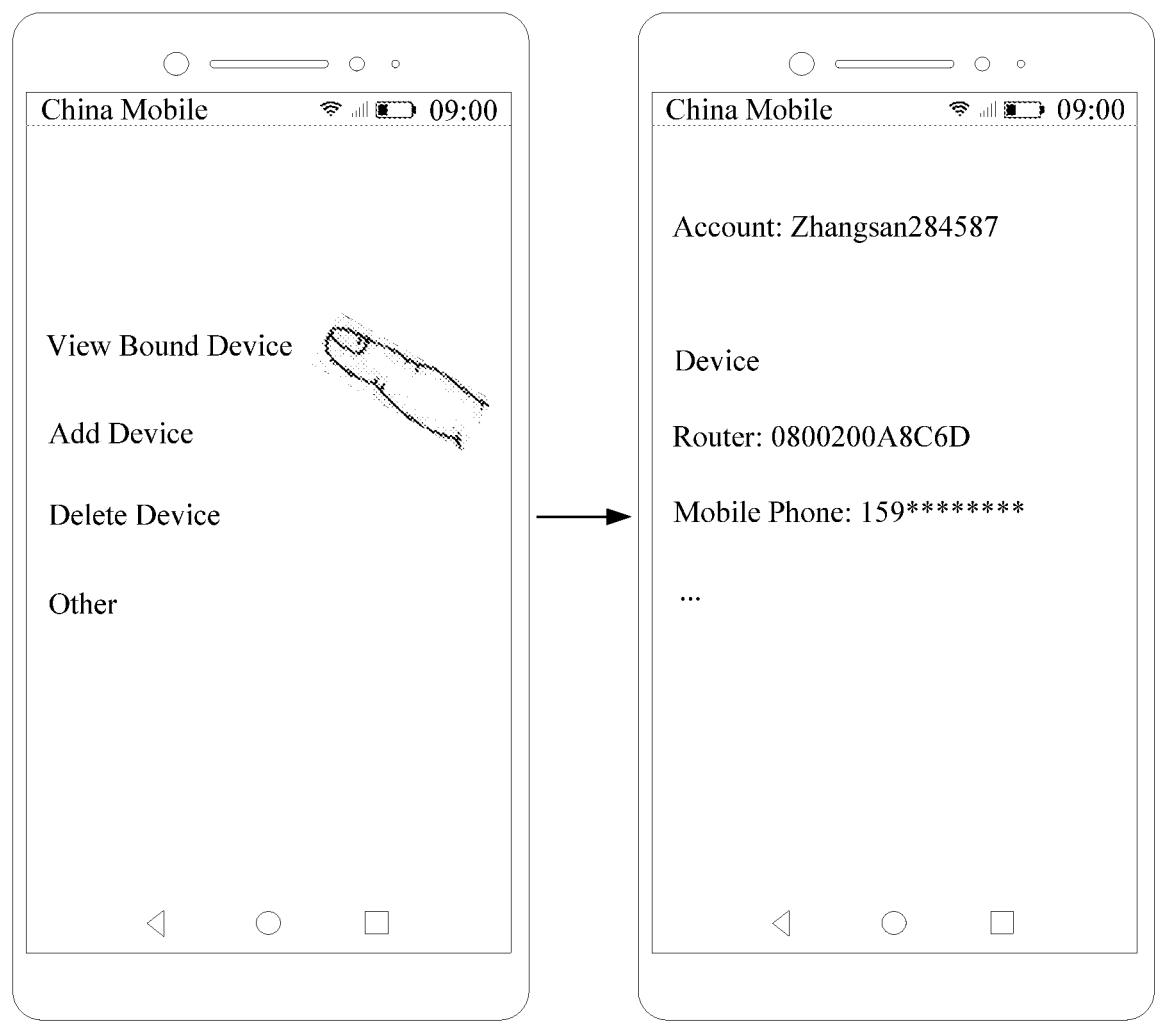
FIG. 12 is another schematic diagram of an interface display of user equipment according to an embodiment of this application.

Further, the first mapping relationship may further include a device identifier of the user equipment corresponding to the account. When the user equipment is a mobile phone, the device identifier of the mobile phone may be a MAC address, a serial number, a QR code, a mobile phone number, or the like. In addition, in a manner similar to the manner of adding an access point, a binding relationship between the mobile phone and the account may be further added. Alternatively, when the mobile phone logs in to the server by using the account, the server may automatically save a correspondence between the account and the mobile phone. In this case, if an option "View Bound Device" in FIG. 11A and FIG. 11B is tapped, as shown in FIG. 12, the mobile phone may display devices such as the access point and the mobile phone bound with the current account; or because the user has entered the account during login and the account is bound by default, if the option "View Bound Device" in FIG. 11A and FIG. 11B is tapped, only devices such as the access point and the mobile phone may be displayed in FIG. 12, but the account is not displayed.

Therefore, the intelligent device can access the WIFI network of the access point specified by the user through account binding.

Alternatively, when the mobile phone logs in to the server by using the WIFI network, the mobile phone may send the device identifier of the access point enabling the WIFI network to the server. The network identifier and the password sent by the server to the first access point are a network identifier and a password corresponding to the WIFI network of the access point accessed by the mobile phone. Therefore, the intelligent device and the mobile phone may access the same WIFI device. The WIFI network used by the mobile phone of the user is generally a WIFI network that the user wants to configure for the intelligent device. For example, in a smart household scenario, devices such as a mobile phone, an intelligent socket, and an intelligent lamp generally use a same WIFI network configured by a same router in a family to perform communication. Therefore, by default, the server may consider that the WIFI network accessed by the mobile phone is the WIFI network to be accessed by the intelligent device, and send the network identifier and the password of the WIFI network accessed by the mobile phone to the intelligent device through the first access point.

In addition, it should be noted that, in the foregoing embodiment of this application, an example in which one account is bound with one access point is used for description. When one account is bound with a plurality of access points, that is, when the first mapping relationship stored on the server includes one account and a plurality of access points, the server may further send network identifiers and passwords of the plurality of access points as a plurality of groups of first network identifiers and first passwords to the intelligent device; and the intelligent device may select one WIFI network (for example, a WIFI network of an access point with highest signal strength) from a plurality of WIFI networks corresponding to the plurality of groups of first network identifiers and first passwords and automatically access the selected WIFI network.

Alternatively, when the first mapping relationship stored on the server includes one account and a plurality of access points, the server may further select one target access point (for example, the access point accessed by the user equipment) from the plurality of access points, and send a network identifier and a password of the target access point as the first network identifier and the first password of the second access point to the intelligent device.

Alternatively, when the first mapping relationship stored on the server includes one account and a plurality of access points, the server may send the network identifier and the password of the access point currently accessed by the user equipment to the first access point, to instruct the first access point to send the network identifier and the password of the access point currently accessed by the user equipment to the intelligent device. The access point and/or the network identifier of the access point currently accessed by the user equipment may be received and obtained from the first access point side or the user equipment side.

In another possible implementation, the server may send second indication information to the first access point, where the second indication information is used to instruct the first access point to send its network identifier and password to the intelligent device. In this case, the second access point and the first access point are the same. For example, when the server determines, based on the first mapping relationship, that the access point bound with the login account of the user equipment is the first access point, the server instructs the first access point to send the network identifier and password of the first access point as the first network identifier and the first password to the intelligent device.

In another possible implementation, that the server instructs the first access point to send a first network identifier and a first password corresponding to a second access point to the intelligent device may include: the server receives first indication information sent by the user equipment, where the first indication information includes at least one of a device identifier of the second access point or the first network identifier of the second access point; and the server sends the first network identifier and the first password of the second access point to the first access point.

Therefore, the user may indicate, by using the user equipment, the target access point and the WIFI network to be accessed by the intelligent device, so that the intelligent device accesses the WIFI network of the target access point.

Further, after the user equipment logs in to the server by using the account, and adds the intelligent device by using the process shown in FIG. 6 to FIG. 8, the server may further bind the intelligent device with the account. In this case, the server may store a second mapping relationship between the account, the access point, the user equipment, and the intelligent device shown in Table 2. To be specific, when the server stores the correspondence between the account and the intelligent device, it may be considered that the intelligent device is an intelligent device authenticated by the user.

TABLE 2

| Second mapping relationship | Account | Access point | User equipment | Intelligent device |
|---|---|---|---|---|
| Second mapping relationship 1 | Account 1 | Access point 1 | User equipment 1 | Intelligent device 1, intelligent device 2, . . . |
| Second mapping relationship 2 | Account 2 | Access point 2 | User equipment 2 | Intelligent device a, intelligent device b, . . . |
| . . . | . . . | . . . | . . . | . . . |

Another embodiment of this application provides a network access method. The method may be applied to a system, and the system may include an intelligent device, an access point, and a server. For a main procedure of the method, refer to FIG. 13.

Step 201 specifically includes: an intelligent device sends a first network connection request to a first access point.

Step 202 specifically includes: the first access point establishes a first network connection between the first access point and the intelligent device in response to the first network connection request.

Step 203 specifically includes: the intelligent device sends a first device identifier of the intelligent device to the first access point.

Step 204 specifically includes: the first access point forwards the first device identifier received from the intelligent device to a server.

Step 205 specifically includes: after receiving the first device identifier sent by the first access point, the server instructs the first access point to send a first network identifier and a first password of a second access point to the intelligent device.

Step 206 specifically includes: the first access point sends, in response to the instruction of the server, the first network identifier and the first password of the second access point to the intelligent device by using the first network connection.

Step 207 specifically includes: after receiving the first network identifier and the first password sent by the first access point, the intelligent device sends a second network connection request to the second access point based on the first network identifier and the first password.

For descriptions about steps 201 to 204, refer to detailed descriptions in the foregoing steps 101 to 104. For descriptions about steps 206 and 207, refer to detailed descriptions in the foregoing steps 107 and 108. Details are not described again herein.

In step 205, the server may instruct the first access point to send a network identifier and a password of a target access point (the second access point) to be accessed by the intelligent device to the intelligent device, so that the intelligent device accesses a WIFI network of the target access point.

In a possible implementation of step 205, the server stores a mapping relationship between an account and an access point, and that the server instructs the first access point to send a first network identifier and a first password of a second access point to the intelligent device includes: the server sends, to the first access point, a network identifier and a password of the access point corresponding to the account, to instruct the first access point to send, to the intelligent device, the network identifier and the password of the access point corresponding to the account.

In this embodiment of this application, the intelligent device may establish a communication channel between the intelligent device and the first access point by using a pre-connected network, obtain the first network identifier and the first password of the second access point from the first access point quickly and accurately by using the channel and only a few packets, and therefore access a WIFI network of the second access point based on the first network identifier and the first password. Therefore, network configuration efficiency and a network configuration success rate can be improved, and user experience can be improved.

Another embodiment of this application provides a network access method. The method may be applied to an access point. For a main procedure of the method, refer to FIG. 14.

Step 301 specifically includes: a first access point establishes a first network connection between the first access point and an intelligent device.

Step 302 specifically includes: the first access point receives a first device identifier of the intelligent device that is sent by the intelligent device.

Step 303 specifically includes: the first access point forwards the first device identifier received from the intelligent device to a server, where the first device identifier is used to trigger the server to instruct the first access point to send a first network identifier and a first password of a second access point to the intelligent device.

The first access point forwards the first device identifier sent by the intelligent device to the server, so that the server can indicate, to the first access point, the second access point and a WIFI network to be accessed by the intelligent device.

Step 304 specifically includes: the first access point sends, in response to the instruction of the server, the first network identifier and the first password of the second access point to the intelligent device by using the first network connection, where the first network identifier and the first password are used by the intelligent device to send a second network connection request to the second access point.

For descriptions about steps 301 to 304, refer to descriptions in the foregoing steps 101, 102, 104, and 107. Details are not described again herein.

In the network access method described in steps 301 to 304, the first access point may establish a communication channel between the first access point and the intelligent device by using a pre-connected network, and send the first network identifier and the first password of the second access point to the intelligent device quickly and accurately by using only a few packets in point-to-point communication mode in the channel, so that the intelligent device accesses the WIFI network corresponding to the first network identifier and the first password. Therefore, network configuration efficiency and a network configuration success rate can be improved, and user experience can be improved.

Another embodiment of this application provides a network access method. The method may be applied to an intelligent device. The method may include the following steps.

401. An intelligent device sends a first network connection request to a first access point.

402. After establishing a first network connection between the intelligent device and the access point, the intelligent device receives, by using the first network connection, a network identifier and a password sent by the access point.

403. The intelligent device sends a second network connection request to a second access point based on the first network identifier and the first password.

In the network access method described in steps 401 to 403, the intelligent device may establish a communication channel between the intelligent device and the first access point by using a pre-connected network, and receive, by using the channel in point-to-point mode, a packet sent by the first access point, and therefore can obtain the first network identifier and the first password from the first access point quickly and accurately by receiving only a few packets and access a WIFI network corresponding to the first network identifier and the first password. Therefore, network configuration efficiency and a network configuration success rate can be improved, and user experience can be improved.

Before step 401, the method further includes: the intelligent device searches for a network identifier of a first network. Step 401 may include: after the network identifier of the first network found by the intelligent device matches that stored by the intelligent device, the intelligent device sends the first network connection request to the first access point.

Before step 402, the method may further include: the intelligent device sends its own first device identifier to the first access point, so that the first access point can send, to the intelligent device, a network identifier and a password of a target access point to be accessed by the intelligent device.

Another embodiment of this application provides a network access method. The method may be applied to a server. The method may include the following steps.

501. A server receives a first device identifier sent by a first access point.

502. The server instructs the first access point to send a first network identifier and a first password of a second access point to an intelligent device.

Therefore, the server can instruct the first access point to send a network identifier and a password of a target access point to be accessed by the intelligent device to the intelligent device, so that the intelligent device accesses a WIFI network of the target access point.

Further, the server may further receive a first device identifier sent by user equipment, and instruct, when determining that the first device identifier received from the user equipment matches the first device identifier received from the first access point, the first access point to send the first network identifier and the first password of the second access point to the intelligent device.

Because generally the user equipment side can obtain the first device identifier of the intelligent device only through a manual operation of a user, after the server obtains the first device identifier sent by the user equipment and determines that the first device identifier received from the user equipment matches the first device identifier received from the first access point, the server may consider that the intelligent device corresponding to the first device identifier is an intelligent device authenticated by the user and has accessed a pre-connected network. Therefore, the server can instruct the first access point to send, to the intelligent device, the first network identifier and the first password corresponding to the second access point. Therefore, only the intelligent device authenticated by the user can access the WIFI network, but an intelligent device not authenticated by the user cannot access the WIFI network. Therefore, security of the network configuration process can be improved.

It should be understood that, in the network access method described in the foregoing embodiment of this application, the intelligent device may access the WIFI network for the first time based on the first network identifier and the first password. Subsequently, the intelligent device may automatically access the WIFI network again based on the first network identifier and the first password.

The network access method described in the foregoing embodiment of this application may be applied to a scenario in which a WIFI network is configured for a single intelligent device for the first time.

Another embodiment of this application further provides another network access method. The method may be applied to a scenario in which network configuration is performed for a plurality of intelligent devices in batches (for example, pre-installation in an estate). The following describes the method in detail.

In this embodiment of this application, a server may store a third mapping relationship between an account and network configuration parameters, as shown in Table 3. The network configuration parameters include an access point, a room identifier, and n device identifiers corresponding to the room identifier, and n is a positive integer. The n device identifiers are device identifiers of n intelligent devices. The third mapping relationship may specifically include the account, a device identifier of the access point, a network identifier and a password of the access point, the room identifier, and the device identifiers of the n intelligent devices. A user may bind the access point, the device identifiers of the n intelligent devices, and the room identifier with the account by using user equipment by using the method in FIG. 11A and FIG. 11B and FIG. 6 to FIG. 8 in the foregoing embodiment. Alternatively, the device identifiers of the n intelligent devices may be obtained by using a mobile storage medium. When the server stores the third mapping relationship, it may be considered that the user has pre-bound or authenticated correspondences between the account and the access point, the account and the room identifier, the access point and the room identifier, the room identifier and the n intelligent devices, and the access point and the n intelligent devices.

TABLE 3

| Third mapping relationship | Account | Access point | Room identifier | n device identifiers |
|---|---|---|---|---|
| Third mapping relationship 1 | Account 1 | Access point 1 | Room identifier 1 | Device identifier 1, device identifier 2, . . . |
| Third mapping relationship 2 | Account 2 | Access point 2 | Room identifier 2 | Device identifier a, device identifier b, . . . |
| . . . | . . . | . . . | . . . | . . . |

The room identifier may be used to identify an intelligent device in a room. For example, the room identifier may be a room number of the user or a mobile phone number of the user. Alternatively, the room identifier may be the account. In this case, the third mapping relationship includes a correspondence between the first access point and the room identifier (that is, the account) and the device identifiers of the n intelligent devices. A specific form of the room identifier is not limited in this embodiment of this application.

Figure 15:
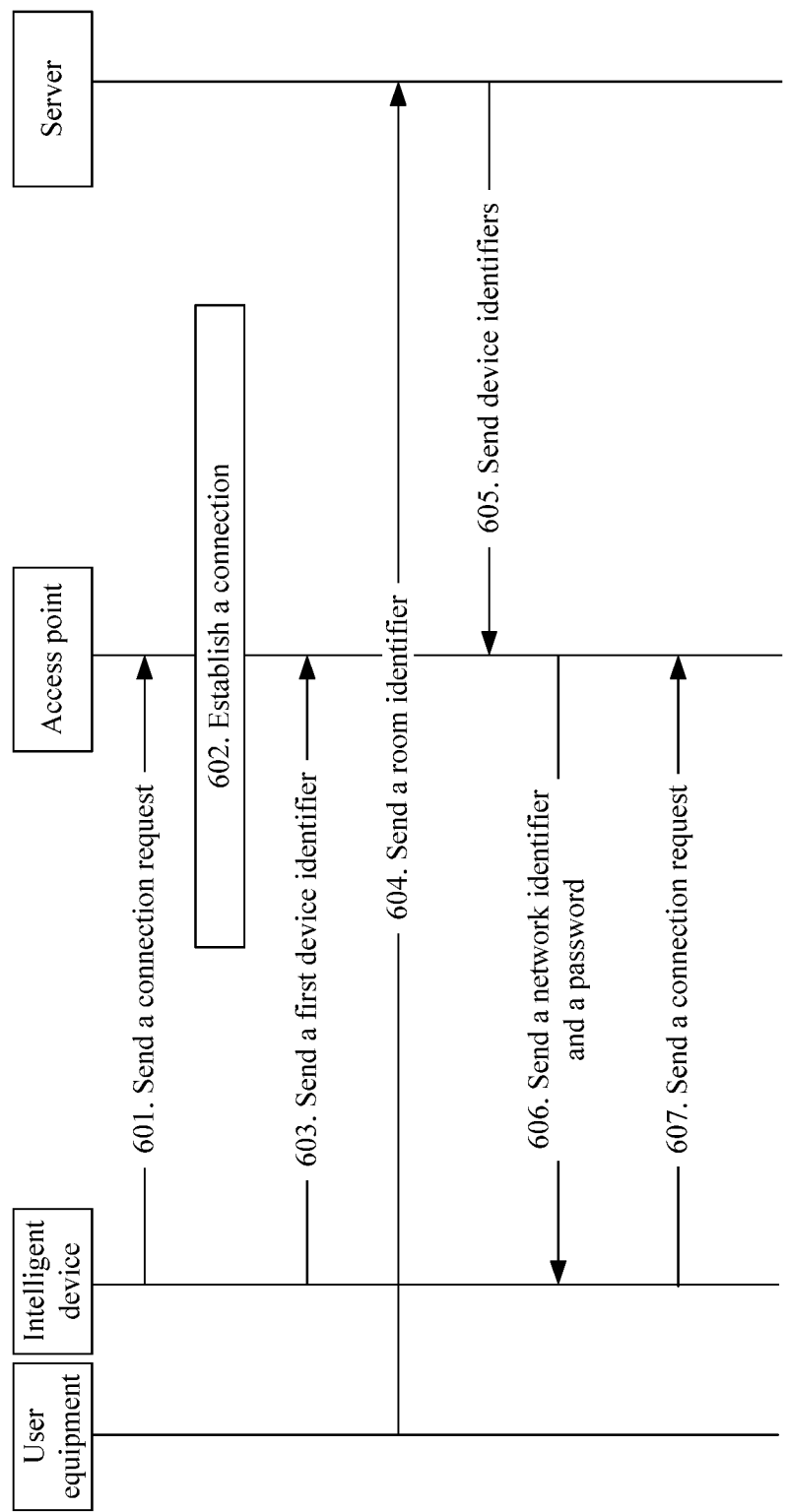
FIG. 15 is a flowchart of another network access method according to an embodiment of this application.

When a server stores a third mapping relationship, for a main procedure of a network access method provided by an embodiment of this application, refer to FIG. 15.

Step 601 specifically includes: an intelligent device sends a first network connection request to an access point.

Step 602 specifically includes: the access point establishes a first network connection between the access point and the intelligent device in response to the first network connection request.

Step 603 specifically includes: the intelligent device sends a first device identifier of the intelligent device to the access point.

For descriptions about steps 601 to 603, refer to descriptions in the foregoing steps 101 to 103. Details are not described again herein.

Step 604 specifically includes: user equipment sends a room identifier to a server by using a login account.

Figure 16:
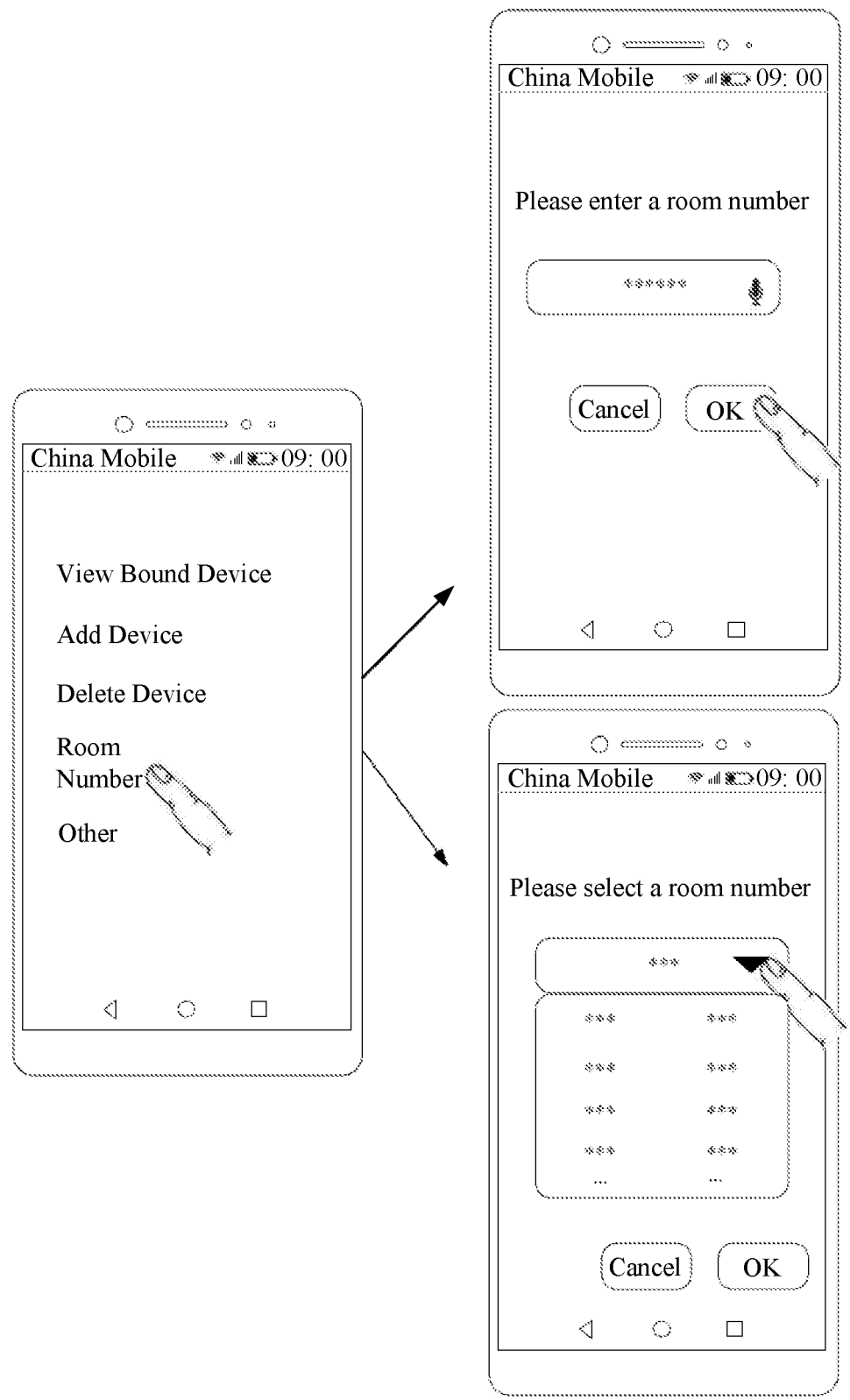
FIG. 16 is another schematic diagram of an interface display of user equipment according to an embodiment of this application.

After login by using the account, the user equipment may send the room identifier to the server. For example, when the room identifier is a room number, referring to FIG. 16, a user may log in to the server by using an app of a mobile phone, enter the room number, and then tap an "OK" button to send the room number to the server.

Step 605 specifically includes: the server sends, to the access point corresponding to the room identifier, n device identifiers corresponding to the room identifier.

The server may send, based on a third mapping relationship, to the access point corresponding to the room identifier, all the device identifiers corresponding to the room identifier.

Step 606 specifically includes: after the access point receives the n device identifiers sent by the server, if determining that the first device identifier matches the n device identifiers, the access point sends a network identifier and a password of the access point to the intelligent device by using the first network connection.

When the room identifier is a room number, if the access point determines that the first device identifier matches the n device identifiers, it indicates that the first device identifier corresponds to the room number sent by the user. In this case, the access point may send the network identifier and the password of the access point to the intelligent device by using the first network connection, so that the intelligent device identified by the first device identifier corresponding to the room number accesses a WIFI network.

Because a plurality of intelligent devices may correspond to the room number, and a plurality of intelligent devices may access a pre-connected network of each access point, the access point may specifically send the network identifier and the password to the plurality of intelligent devices that access the pre-connected network and correspond to the room number. Therefore, the plurality of intelligent devices that access the pre-connected network and correspond to the room number access the WIFI network in batches, and network configuration is implemented for the intelligent devices in batches.

In addition, the foregoing uses the room number as an example for description. When the room number is replaced with a mobile phone number, the user equipment may send the mobile phone number to the server by using the login account. The access point may send the network identifier and the password to a plurality of intelligent devices that access a pre-connected network and correspond to the mobile phone number of the user. Therefore, the plurality of intelligent devices that access the pre-connected network and correspond to the mobile phone number access the WIFI network in batches, and network configuration is implemented for the intelligent devices in batches.

Therefore, in this embodiment of this application, when the server stores the third mapping relationship, it may be considered that a correspondence between the intelligent device and the access point and a correspondence between the intelligent device and the WIFI network of the access point have been set in advance before network configuration is actually performed by using the access point.

In addition, n intelligent devices in the third mapping relationship stored in the server may be considered as intelligent devices that are authenticated in advance. The access point sends the network identifier and the password to the intelligent devices only when the access point determines that the intelligent devices accessing the pre-connected network match n authenticated intelligent devices. When the intelligent devices accessing the pre-connected network do not match the n authenticated intelligent devices, the access point does not send the network identifier and the password directly. To be specific, in the method provided by this embodiment of this application, the intelligent devices can be authenticated when network configuration is implemented in batches. Therefore, security of the network configuration process is improved. However, in an existing multicast/broadcast network configuration mode, although network configuration may also be implemented in batches, security is relatively low due to lack of intelligent device authentication.

If an intelligent device accessing the pre-connected network is not in a range of the n intelligent devices, the intelligent device may be a new device, and WIFI network configuration may be performed for the intelligent device according to the network access method described in steps 101 to 108. Details are not described again herein.

Step 607 specifically includes: after receiving the network identifier and the password sent by the access point, the intelligent device sends a second network connection request to the access point based on the network identifier and the password.

After receiving the network identifier and the password sent by the access point, the intelligent device may send the network identifier and the password to the access point by using the second network connection request, to access the WIFI network of the access point.

The intelligent device may establish a communication channel between the intelligent device and the access point by using the pre-connected network, and receive, by using the channel in point-to-point mode, a packet sent by the access point, and therefore can obtain the network identifier and the password from the access point quickly and accurately by receiving only a few packets and access the WIFI network. Therefore, network configuration efficiency and a network configuration success rate can be improved, and user experience can be improved.

In addition, in another existing network configuration solution, generally a user can perform network configuration for intelligent devices one by one only, and cannot implement network configuration in batches. Therefore, a network configuration time is long, and especially in a scenario similar to an estate pre-installation market in which there are a relatively large quantity of intelligent devices, operation costs of the user are very high. The method provided by this embodiment of this application can quickly implement network configuration for the intelligent devices in batches, reduce operations costs of the user, reduce a network configuration time, improve network configuration efficiency, and improve user experience.

Figure 17:
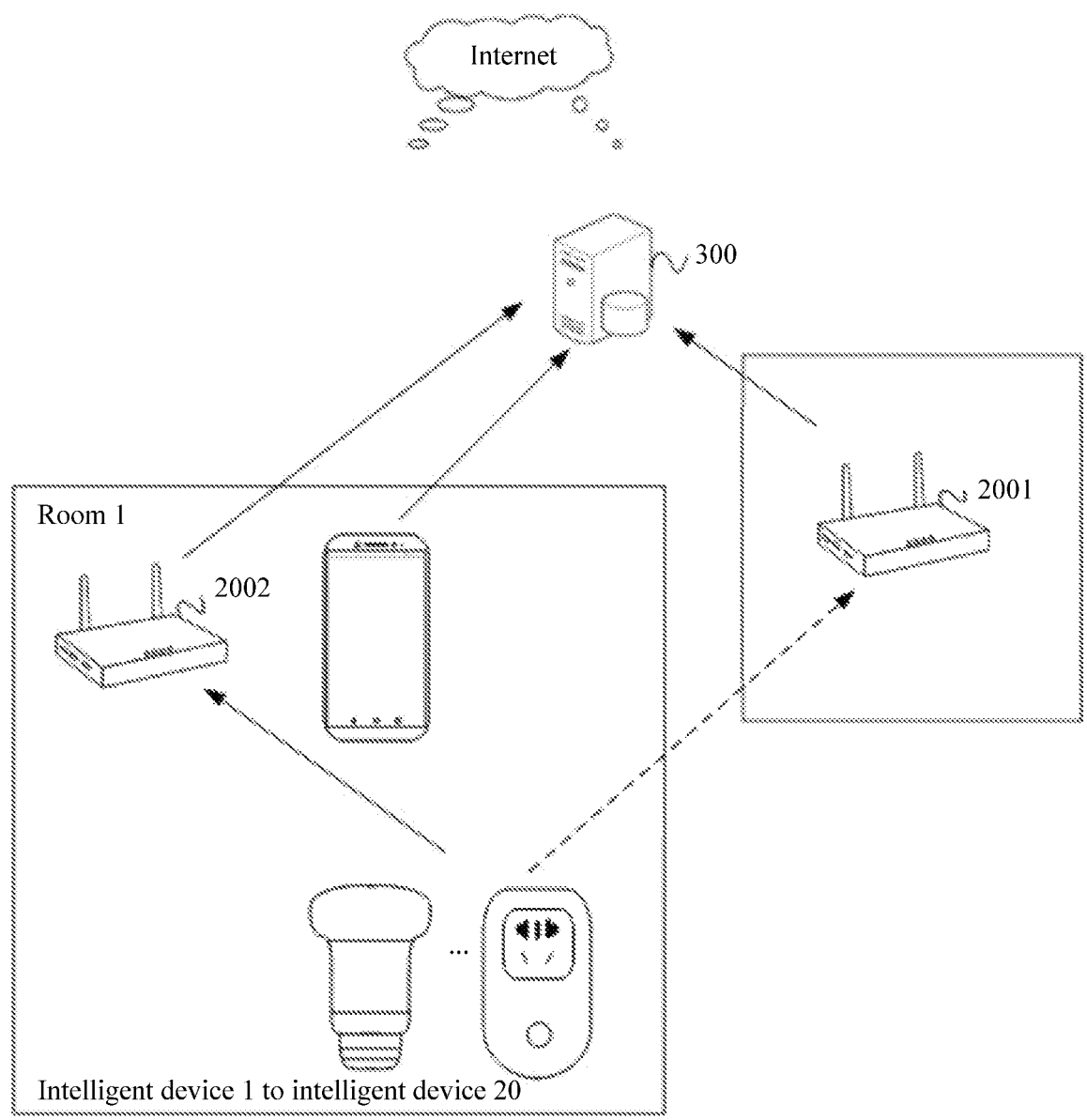
FIG. 17 is a schematic diagram of a scenario according to an embodiment of this application.

For example, in an estate pre-installation scenario of a smart household, there are a large quantity of intelligent devices in each room, and the quantity may be a dozen or even dozens. Referring to FIG. 17, before intelligent devices in a room 1 are installed, an installation worker may obtain device identifiers of the intelligent devices to be installed (for example, by scanning QR codes). Then the device identifiers may be stored on a server by using an app of a mobile phone or a USB flash drive or in another manner. The server may save a mapping relationship between the device identifiers and the room number 1. After the intelligent devices are installed and a user accepts a house, the user sets a router 2002 in the room 1. After the router 2002 sets a WIFI network for the first time and the mobile phone logs in to the server by using an account, the server saves a correspondence between the account, an intelligent device 1 to an intelligent device 20 in the room 1, the room 1, and the router 2002, that is, saves the foregoing third mapping relationship. After network configuration on the router 2002, the intelligent devices in the room 1 may be pre-connected to the router 2002. The user may log in to the server by using the mobile phone and account, and send the room number 1 to the server as a room identifier; the server sends, to the router 2002 based on the third mapping relationship, the device identifiers of the intelligent device 1 to the intelligent device 20 corresponding to the room 1; and for the intelligent devices pre-connected to the router 2002, when the router 2002 determines that the intelligent devices match the intelligent devices corresponding to the room 1 in the third mapping relationship, the router 2002 sends a network identifier and a password of the WIFI network of the router 2002 to the intelligent devices, so that the intelligent devices in the room 1 can access the WIFI network in batches automatically.

In a possible case, the intelligent device 1 to the intelligent device 20 in the room 1 all access the pre-connected network of the router 2002. In this case, the router 2002 may send the network identifier and the password of the router 2002 to the intelligent device 1 to the intelligent device 20 separately.

In another possible case, some intelligent devices in the room 1, for example, the intelligent device 1 to the intelligent device 18 access the pre-connected network of the router 2002, but the intelligent device 19 and the intelligent device 20 access a pre-connected network of a neighbor's router 2001. In this case, the router 2002 may send the network identifier and the password of the router 2002 to the intelligent device 1 to the intelligent device 18 separately. A WIFI network may be configured for the intelligent device 19 and the intelligent device 20 according to the steps 101 to 108 in the foregoing method embodiment.

An embodiment of this application provides a network access method. The method may be applied to a system. The system includes an intelligent device, an access point, and a server. The server stores a fourth mapping relationship shown in Table 4. The fourth mapping relationship includes a correspondence between an access point and a room identifier, and a correspondence between a room identifier and n device identifiers.

TABLE 4

| Fourth mapping relationship | Access point | Room identifier | n device identifiers |
| --- | --- | --- | --- |
| Fourth mapping relationship 1 | Access point 1 | Room identifier 1 | Device identifier 1, device identifier 2, . . . |
| Fourth mapping relationship 2 | Access point 2 | Room identifier 2 | Device identifier a, device identifier b, . . . |
| . . . | . . . | . . . | . . . |

The network access method may include the following steps.

701. An intelligent device sends a first network connection request to an access point.

702. The access point establishes a first network connection between the access point and the intelligent device in response to the first network connection request.

703. The intelligent device sends a first device identifier of the intelligent device to the access point.

704. A server sends, to the access point, n device identifiers corresponding to a room identifier corresponding to the access point.

705. After the access point receives the n device identifiers sent by the server, if determining that the first device identifier matches the n device identifiers, the access point sends a network identifier and a password of the access point to the intelligent device by using the first network connection.

706. After receiving the network identifier and the password sent by the access point, the intelligent device sends a second network connection request to the access point based on the network identifier and the password.

The intelligent device may establish a communication channel between the intelligent device and the access point by using a pre-connected network, and receive, by using the channel in point-to-point mode, a packet sent by the access point, and therefore can obtain the network identifier and the password from the access point quickly and accurately by receiving only a few packets and access a WIFI network. Therefore, network configuration efficiency and a network configuration success rate can be improved, and user experience can be improved.

For descriptions about steps 701 to 703, refer to descriptions in the foregoing steps 601 to 603. For descriptions about steps 705 and 706, refer to descriptions in the foregoing steps 606 and 607. Details are not described again herein.

In step 704, the server may send, to the access point, the n device identifiers corresponding to the room identifier corresponding to the access point, so that the access point connects the intelligent devices corresponding to the room identifier to the WIFI network. When a plurality of intelligent devices access the pre-connected network of the access point, the access point may further connect a plurality of intelligent devices matching the n device identifiers among the intelligent devices accessing the pre-connected network, to the WIFI network in batches.

In a possible implementation, the room identifier is an account used by a user to log in to the server. In step 703, the server may send, to the access point corresponding to the account, device identifiers of n intelligent devices corresponding to the account.

In another possible implementation, the room identifier is different from the account used by the user to log in to the server, for example, may be a room number or a mobile phone number. Before step 704, the server may further receive a room identifier sent by user equipment, where the room identifier is sent by the user equipment to the server after the user equipment logs in to the server by using the account. In step 704, the access point may receive, from the server, the n device identifiers corresponding to the room identifier.

An embodiment of this application provides a network access method. The method may be applied to an access point. The method may include the following steps.

801. An access point establishes a first network connection between the access point and an intelligent device.

802. The access point receives a first device identifier sent by the intelligent device.

803. The access point receives n device identifiers sent by a server, where n is a positive integer.

804. If the first device identifier matches the n device identifiers, the access point sends a network identifier and a password of the access point to the intelligent device by using the first network connection.

In this embodiment of this application, the access point may establish a communication channel between the access point and the intelligent device by using a pre-connected network, and send a packet to the intelligent device by using the channel in point-to-point mode, so that the intelligent device can obtain the network identifier and the password quickly and accurately by receiving only a few packets and access a WIFI network. Therefore, network configuration efficiency and a network configuration success rate can be improved, and user experience can be improved.

In addition, in this embodiment of this application, when a plurality of intelligent devices access the pre-connected network of the access point, the access point may connect intelligent devices matching the device identifiers sent by the server, to the WIFI network in batches. Therefore, network configuration is implemented for the intelligent devices in batches.

An embodiment of this application provides a network access method. The method may be applied to an intelligent device. The method may include the following steps.

901. An intelligent device sends a first network connection request to an access point.

902. After establishing a first network connection between the intelligent device and the access point, the intelligent device receives, by using the first network connection, a network identifier and a password sent by the access point.

903. The intelligent device sends a second network connection request to the access point based on the network identifier and the password.

The intelligent device may establish a communication channel between the intelligent device and the access point by using a pre-connected network, and receive, by using the channel in point-to-point mode, a packet sent by the access point, so that the intelligent device can obtain the network identifier and the password quickly and accurately by receiving only a few packets and access a WIFI network. Therefore, network configuration efficiency and a network configuration success rate can be improved, and user experience can be improved.

An embodiment of this application provides a network access method. The method may be applied to a server, and the server stores a third mapping relationship shown in Table 3. The network access method may include the following steps.

1001. A server receives a room identifier sent by user equipment by using a login account.

1002. The server sends, to an access point corresponding to the room identifier, device identifiers of n intelligent devices corresponding to the room identifier.

The server sends, to the access point corresponding to the room identifier, the device identifiers of the n intelligent devices corresponding to the room identifier, so that the access point sends a network identifier and a password to at least one of the n intelligent devices, and that the at least one intelligent device accesses a WIFI network in batches.

In a possible implementation, the room identifier is an account, and in step 703, the server may send, to the access point corresponding to the account, the device identifiers of the n intelligent devices corresponding to the account.

In another possible implementation, the room identifier is different from the account used by a user to log in to the server, for example, may be a room number or a mobile phone number. In step 1002, the n intelligent devices corresponding to the room identifier and sent by the server also correspond to the login account of the user equipment, and the access point corresponding to the room identifier also corresponds to the login account of the user equipment.

In the network access method described in the foregoing embodiment of this application, network configuration can be implemented for the intelligent device for the first time, so that the intelligent device accesses the WIFI network for the first time. The following embodiment provides a scenario in which network reconfiguration is performed for an intelligent device after network configuration is performed for the intelligent device for the first time, for example, a scenario such as replacing an access point, or modifying a network identifier and/or a password of an access point.

An embodiment of this application provides a network access method. The method may be applied to a system, and the system may include an intelligent device, an access point, user equipment, and a server. For a main procedure of the method, refer to FIG. 18.

Step 1101 specifically includes: a first access point sets a first network based on a third network identifier and a third password.

The first network is a pre-connected network. For descriptions about the pre-connected network, refer to descriptions in the foregoing steps 101 and 102. Details are not described again herein.

The first access point may set the pre-connected network based on the third network identifier and the third password. To be specific, a network identifier of the pre-connected network set by the first access point is the third network identifier, and a password of the pre-connected network is the third password.

Step 1102 specifically includes: an intelligent device sends a first network connection request to the first access point, where the first network connection request includes the third network identifier and the third password.

1103. The first access point establishes a first network connection between the first access point and the intelligent device in response to the first network connection request.

In steps 1102 and 1103, the intelligent device may access, based on the third network identifier and the third password, the first network set by the first access point.

Step 1104 specifically includes: the first access point sends a second network identifier and/or a second password of the first access point to the intelligent device by using the first network connection.

Step 1105 specifically includes: the intelligent device sends a second network connection request to the first access point based on the second network identifier and/or the second password.

In this embodiment of this application, the intelligent device may establish a communication channel between the intelligent device and the first access point by using the pre-connected network, and receive, by using the channel in point-to-point mode, a packet sent by the first access point, so that the intelligent device can obtain the network identifier and the password quickly and accurately by receiving only a few packets and access a WIFI network. Therefore, network configuration efficiency and a network configuration success rate can be improved, and user experience can be improved.

In some embodiments, the network access method may be applied to a scenario in which a second access point is replaced with the first access point. In a possible implementation of replacing an access point, a server stores a fifth mapping relationship between the first access point and network parameters of the second access point, the network parameters include a network identifier and a password, and the third network identifier and the third password are network parameters of the second access point.

TABLE 5

| Fifth mapping relationship | First access point | Second access point | Network parameters of the second access point |
|---|---|---|---|
| Fifth mapping relationship 1 | Access point 1 | Access point 2 | Network identifier 1 and password 1 |
| . . . | . . . | . . . | . . . |

Before step 1101, the method may further include: the first access point receives the third network identifier and the third password of the second access point that are sent by the server. For example, the second access point may be a router before replacement; the first access point may be a router after replacement; and the third network identifier and the third password are a network identifier and a password of the router before replacement.

In step 1101, after the first access point receives the third network identifier and the third password of the second access point that are sent by the server, the first access point sets the pre-connected network based on the third network identifier and the third password of the second access point before replacement.

In step 1102, when the intelligent device sends the first network connection request to the first access point, and the first network connection request includes the third network identifier and the third password of the second access point, it may indicate that the intelligent device has previously accessed a WIFI network of the second access point.

In step 1103, in response to the first network connection request sent by the intelligent device, the first access point connects the intelligent device that has previously accessed the second access point, to the pre-connected network, to establish the communication channel between the first access point and the intelligent device, and prepare the channel in advance for the intelligent device to receive the second network identifier and/or the second password required for subsequently accessing a WIFI network.

In steps 1104 and 1105, the first access point sends the second network identifier and the second password of the first access point to the intelligent device, so that the intelligent device previously accessing the second access point automatically accesses the WIFI network of the first access point.

In another possible implementation of replacing an access point, network parameters of the second access point further include n device identifiers. To be specific, the server may store a sixth mapping relationship shown in Table 6.

TABLE 6

| Sixth mapping relationship | First access point | Second access point | Network parameters of the second access point |
|---|---|---|---|
| Sixth mapping relationship 1 | Access point 1 | Access point 2 | Network identifier 1 and password 1; and device identifier 1, device identifier 2, . . . |
| . . . | . . . | . . . | . . . |

When the server stores a correspondence between a device identifier of an intelligent device and an access point, it may indicate that the intelligent device is a secure device authenticated by a user. However, an intelligent device that has previously accessed the WIFI network temporarily (for example, a mobile phone of a visitor) or an intelligent device whose security cannot be determined is generally not bound with an account. Therefore, if the server or the first access point determines that a first device identifier corresponds to the second access point, it may indicate that the intelligent device is a secure device authenticated by the user. Therefore, the first access point may send the second network identifier and the second password to the intelligent device, so that the intelligent device can automatically access, based on the second network identifier and the second password, the WIFI network corresponding to the first access point and automatically switch from the second access point to the first access point. In this way, network reconfiguration is implemented for the intelligent device.

Before the first access point sends the second network identifier and the second password of the first access point to the intelligent device, the method further includes: the intelligent device sends the first device identifier of the intelligent device to the first access point; the first access point forwards the first device identifier sent by the intelligent device to the server; and when determining that the first device identifier matches the n device identifiers, the server instructs the first access point to send the second network identifier and the second password of the first access point to the intelligent device. The foregoing step 1104 may include: the first access point sends the second network identifier and the second password of the first access point to the intelligent device in response to the instruction of the server.

In this implementation, the first access point may report the first device identifier of the intelligent device accessing the pre-connected network to the server; and when determining that the first device identifier matches the n device identifiers corresponding to the second access point before replacement, the server may determine that the intelligent device accessing the pre-connected network has previously accessed the WIFI network of the second access point, and therefore may instruct the first access point to send the second network identifier and the second password of the first access point to the intelligent device, so that the intelligent device can automatically switch from the second access point to the first access point.

In another possible implementation of replacing an access point, when the server further stores a mapping relationship between the second access point and the n device identifiers, before step 1101, the method further includes: the intelligent device sends the first device identifier of the intelligent device to the first access point; the server sends, to the first access point, the n device identifiers corresponding to the second access point; and when determining that the first device identifier matches the n device identifiers, the first access point sends the second network identifier and the second password of the first access point to the intelligent device.

In this implementation, the server may send, to the first access point, the n device identifiers corresponding to the second access point before replacement; and when determining that the first device identifier matches the n device identifiers, the first access point may determine that the intelligent device accessing the pre-connected network has previously accessed the WIFI network of the second access point, and therefore may send the second network identifier and the second password of the first access point to the intelligent device, so that the intelligent device can automatically switch from the second access point to the first access point.

When the server stores a correspondence between a device identifier of an intelligent device and an access point, it may indicate that the intelligent device is a secure device authenticated by the user. However, an intelligent device that has previously accessed the WIFI network temporarily (for example, a mobile phone of a visitor) or an intelligent device whose security cannot be determined is generally not bound with an access point. Therefore, if the server or the first access point determines that the first device identifier corresponds to the second access point, it may indicate that the intelligent device is a secure device authenticated by the user. Therefore, the first access point may send the second network identifier and the second password to the intelligent device, so that the intelligent device can automatically access, based on the second network identifier and the second password, the WIFI network corresponding to the first access point and automatically switch from the second access point to the first access point. In this way, network reconfiguration is implemented for the intelligent device.

Specifically, a plurality of intelligent devices that have previously accessed the second access point may all automatically switch from the second access point to the first access point by using the method provided by the embodiment of this application. In this way, the intelligent devices implement switching between access points in batches.

For example, when a router 2002 in FIG. 9 needs to be replaced with a router 2003 due to damage or the like, before power-on of the router 2003, a server may store a correspondence between an account and a network identifier and a password of the router 2002 (specifically, when the router 2002 sets a WIFI network for the first time, a user may log in to the server by using the account, so that the server saves the correspondence); and when the router 2002 is removed, and the router 2003 is powered on for setting a WIFI network, the user may log in to the server by using user equipment and the account, so that the server saves a correspondence between the account and the router 2003 (and a network identifier and a password of the router 2003). Therefore, the server stores a correspondence between the account, the router 2003, the router 2002, and the network identifier and the password of the WIFI network of the router 2002. When determining that the router 2003 is added for the router 2002 bound with the account, the server may send, to the router 2003, the network identifier and the password of the router 2002 bound with the account. Alternatively, when the router 2002 is removed, the user may log in to the server by using the user equipment and the account, and mark, on the server, the router 2002 as invalid; and when determining that the router 2002 is invalid and the router 2003 is also bound with the account, the server may send the network identifier and the password of the router 2002 to the router 2003.

Further, the router 2003 may set a pre-connected network based on the network identifier and the password of the router 2002, to connect an intelligent device previously accessing the router 2002 to the pre-connected network set by the router 2003 and send the network identifier and the password of the router 2003 to the intelligent device by using the pre-connected network, so that the intelligent device previously accessing the WIFI network of the router 2002 re-accesses the WIFI network of the router 2003. Therefore, the intelligent device connected to the old router can be synchronized to the new router automatically, and network reconfiguration is implemented for the intelligent device.

Further, after the server sends the network identifier and the password of the router 2002 to the router 2003, the server may cancel a binding relationship between the router 2002, the network identifier and password of the router 2002, and the account.

It should be noted that, in the fifth mapping relationship shown in Table 5 and the sixth mapping relationship shown in Table 6, the account may include the account used by the user to log in to the server. Details are not described again herein.

In other embodiments, the network access method may be applied to a scenario in which the first access point modifies at least one of the network identifier or the password. In the scenario, the third network identifier and the third password are network parameters before modification by the first access point, and the second network identifier and the second password are network parameters after modification by the first access point. The network parameters before modification by the first access point and the network parameters after modification by the first access point may be completely different or partially different.

Specifically, when the first access point modifies only the password, the second network identifier and the third network identifier are the same, and the second password and the third password are different; when the first access point modifies only the network identifier, the second password and the third password are the same, and the second network identifier and the third network identifier are different; or when the first access point modifies both the network identifier and the password, the second network identifier and the third network identifier are different, and the second password and the third password are also different.

In step 1101, when the first access point determines that the second network identifier and/or the second password corresponding to the first access point are modified to the third network identifier and/or the third password, the first access point may set the old third network identifier and third password before modification to the network identifier and the password of the pre-connected network, to enable the pre-connected network, so that the intelligent device previously accessing the first access point based on the third network identifier and the third password can access the pre-connected network of the first access point based on the third network identifier and the third password.

The foregoing step 1104 may include: when only the password of the first access point is modified, the first access point sends the second password of the first access point to the intelligent device by using the first network connection;

when only the network identifier of the first access point is modified, the first access point sends the second network identifier of the first access point to the intelligent device by using the first network connection; or when the network identifier and the password of the first access point are modified, the first access point sends the second network identifier and the second password of the first access point to the intelligent device by using the first network connection.

In steps 1104 and 1105, the first access point may send the second network identifier and the second password after modification by the first access point to the intelligent device, so that the intelligent device previously accessing the WIFI network corresponding to the third network identifier and the third password before modification by the first access point automatically accesses the WIFI network corresponding to the second network identifier and the second password after modification by the first access point.

In another possible implementation, the server stores a mapping relationship between the first access point and the n device identifiers, where the n device identifiers may be intelligent devices that have previously accessed the WIFI network of the first access point. Before step 1104, the method may further include: the first access point receives the first device identifier of the intelligent device that is sent by the intelligent device; and the first access point forwards the first device identifier received from the intelligent device to the server. When determining that the first device identifier matches the n device identifiers corresponding to the first access point, the server may instruct the first access point to send the second network identifier and the second password of the first access point to the intelligent device. Step 1104 may include: the first access point sends, in response to the instruction of the server, the second network identifier and the second password of the first access point to the intelligent device by using the first network connection.

In another possible implementation, the server stores a mapping relationship between the first access point and the n device identifiers, where the n device identifiers may be intelligent devices that have previously accessed the WIFI network of the first access point. Before step 1104, the method may further include: the first access point receives the first device identifier of the intelligent device that is sent by the intelligent device, and the n device identifiers corresponding to the first access point and sent by the server. When determining that the first device identifier matches the n device identifiers, the first access point sends the second network identifier and the second password of the first access point to the intelligent device.

To be specific, the first access point may send the second network identifier and the second password to the intelligent device previously accessing the WIFI network of the first access point, so that the intelligent device previously accessing the WIFI network of the first access point automatically accesses a new WIFI network corresponding to the network identifier and/or password modified by the first access point.

Therefore, in this embodiment of this application, when the first access point receives the third network identifier and/or the third password before modification by the first access point and sent by the intelligent device, the first access point may determine that the intelligent device has previously accessed the WIFI network of the first access point, that is, the intelligent device is an authenticated secure intelligent device. Therefore, the first access point may connect the intelligent device to the pre-connected network, and send, to the intelligent device, the third network identifier and the third password modified by the first access point, so that the intelligent device automatically switches to the WIFI network corresponding to the modified third network identifier and third password.

When a plurality of intelligent devices have previously accessed the first access point, in the method provided by this embodiment of this application, in a scenario in which the first access point modifies the network identifier and/or the password, a plurality of intelligent devices can automatically switch to the corresponding new WIFI network after modification by the first access point, and network reconfiguration is implemented for the plurality of intelligent devices.

For example, if a WIFI network previously set by the router 2002 in FIG. 9 corresponds to a network identifier 1 and a password 1, in a scenario in which the password 1 is modified to a password 2 due to security or the like, the router 2002 may save the password 1 before modification, and use the network identifier 1 and the password 1 as a network identifier and a password of an enabled pre-connected network, so that the intelligent device previously accessing the WIFI network corresponding to the network identifier 1 and the password 1 accesses the pre-connected network. In addition, the router 2002 may send the password 2 after modification to the intelligent device by using the pre-connected network, or the router 2002 may send the network identifier 1 and the password 2 after modification to the intelligent device by using the pre-connected network, so that the intelligent device automatically accesses another WIFI network based on the network identifier 1 and the password 2.

For example, in FIG. 17, if a previous WIFI network of the router 2002 corresponds to a network identifier 1 and a password 1, in a scenario in which the router 2002 modifies the network identifier 1 to a network identifier 2, the router 2002 may save the network identifier 1 before modification, and use the network identifier 1 and the password 1 as a network identifier and a password of an enabled pre-connected network, so that the intelligent device previously accessing the WIFI network corresponding to the network identifier 1 and the password 1 accesses the pre-connected network. In addition, the router 2002 may send the network identifier 2 after modification to the intelligent device by using the pre-connected network, or the router 2002 may send the password 1 and the network identifier 2 after modification to the intelligent device by using the pre-connected network, so that the intelligent device automatically accesses a new WIFI network based on the network identifier 2 and the password 1.

For example, in FIG. 17, if a previous WIFI network of the router 2002 corresponds to a network identifier 1 and a password 1, in a scenario in which the router 2002 modifies the network identifier 1 and the password 1 to a network identifier 2 and a password 2, the router 2002 may save the network identifier 1 and the password 1 before modification, and use the network identifier 1 and the password 1 as a network identifier and a password of an enabled pre-connected network, so that the intelligent device previously accessing the WIFI network corresponding to the network identifier 1 and the password 1 accesses the pre-connected network. In addition, the router 2002 may send the network identifier 2 and password 2 after modification to the intelligent device by using the pre-connected network, or the router 2002 may send the network identifier 2 and password 2 after modification to the intelligent device by using the pre-connected network, so that the intelligent device automatically accesses a new WIFI network based on the network identifier 2 and the password 2

In addition, in this embodiment of this application, when the first access point modifies the network identifier and/or the password, the user may log in to the server by using the user equipment and account, so that the network identifier and the password of the access point bound with the account are updated on the server side.

In addition, it should be noted that, in this embodiment of this application, that the first access point sets the WIFI network for the first time and is bound with the account may further include: the network identifier and password of the WIFI network set by the first access point are bound with the account.

An embodiment of this application provides a network access method. The method may be applied to an access point. The method may include the following steps.

1201. A first access point sets a first network based on a third network identifier and a third password.

1202. After establishing a first network connection between the first access point and an intelligent device, the first access point sends a second network identifier and/or a second password of the first access point to the intelligent device by using the first network connection.

In some embodiments, the third network identifier and the third password are network parameters of a second access point. Before step 1201, the method may further include: the first access point receives the third network identifier and the third password of the second access point that are sent by a server.

In a possible implementation, before step 1202, the method may further include: the first access point receives a first device identifier of the intelligent device that is sent by the intelligent device; and the first access point forwards the first device identifier sent by the intelligent device to the server, where the first device identifier is used by the server to determine whether n device identifiers corresponding to the second access point are matched. Step 1202 may include: the first access point sends the second network identifier and the second password of the first access point to the intelligent device in response to an instruction of the server.

In another possible implementation, before step 1201, the method further includes: the first access point receives a first device identifier of the intelligent device that is sent by the intelligent device; the first access point receives n device identifiers corresponding to the second access point and sent by the server, where n is a positive integer; and when determining that the first device identifier matches the n device identifiers, the first access point sends the second network identifier and the second password of the first access point to the intelligent device.

When the first device identifier of the intelligent device accessing a pre-connected network matches the n device identifiers of the second access point, it may indicate that the intelligent device has previously accessed the second access point. Therefore, the first access point may automatically switch the intelligent device that has previously accessed the second access point to the first access point.

In other embodiments, the third network identifier and the third password are network parameters before modification by the first access point, the second network identifier and the second password are network parameters after modification by the first access point, and the network parameters before modification by the first access point and the network parameters after modification by the first access point may be completely different or partially different. In this embodiment, the first access point may automatically connect an intelligent device accessing a WIFI network of the first access point before the network identifier and/or password are/is modified, to a WIFI network of the first access point after the network identifier and/or password are/is modified.

Another embodiment of this application provides a network access method. The method may be applied to an intelligent device. The method may include the following steps.

1301. An intelligent device sends a first network connection request to a first access point, where the first network connection request includes a third network identifier and a third password.

The third network identifier and the third password may be a network identifier and a password of a second access point, or may be a network identifier and a password before modification by the first access point.

1302. The intelligent device receives a second network identifier and/or a second password of the first access point that are/is sent by the first access point.

1303. The intelligent device sends a second network connection request to the first access point based on the second network identifier and/or the second password.

For descriptions about steps 1301 to 1303, refer to descriptions about the first access point in the foregoing steps 1101 to 1105. Details are not described again herein.

In this embodiment of this application, an intelligent device that has previously accessed the second access point, or an intelligent device that has previously accessed the first access point based on the network identifier and the password before modification by the first access point, may access a pre-connected network of the first access point by sending the first network connection request, and receive, by using the pre-connected network, the second network identifier and the second password of the first access point that are sent by the first access point, to automatically switch to the first access point. In addition, the intelligent device may establish a communication channel between the intelligent device and the first access point by using the pre-connected network, and receive, by using the channel in point-to-point mode, a packet sent by the first access point, so that the intelligent device can obtain the network identifier and the password quickly and accurately by receiving only a few packets and access a WIFI network. Therefore, network configuration efficiency and a network configuration success rate can be improved, and user experience can be improved.

Further, before step 1302, the intelligent device may further send a first device identifier of the intelligent device to the first access point.

Another embodiment of this application provides a network access method. The method may be applied to a server. The server may store a mapping relationship between a first access point and network configuration parameters of a second access point, where the network configuration parameters of the second access point include a third network identifier and a third password and n device identifiers. The method includes the following steps.

1401. A server sends a third network identifier and a third password of a second access point to a first access point.

1402. The server receives a first device identifier of an intelligent device that is sent by the first access point.

1403. After the first device identifier matches n device identifiers, the server instructs the first access point to send a second network identifier and a second password of the first access point to the intelligent device.

When the server determines that the first device identifier of the intelligent device matches the n device identifiers corresponding to the second access point, it may indicate that the intelligent device has previously accessed a WIFI network of the second access point. In this case, the server may instruct the first access point to send the network identifier and password of the first access point to the intelligent device corresponding in advance to the second access point, so that the intelligent device switches from the second access point to the first access point.

Another embodiment of this application provides a network access method. The method may be applied to a server. The server may store a mapping relationship between a first access point and network configuration parameters of a second access point, where the network configuration parameters of the second access point include a third network identifier and a third password and n device identifiers. The method includes the following steps.

1501. A server sends a third network identifier and a third password of a second access point to a first access point.

1502. The server sends, to the first access point, n device identifiers corresponding to the second access point, where the n device identifiers are used by the first access point to determine whether a first device identifier matches the n device identifiers.

Herein, n intelligent devices corresponding to the second access point are intelligent devices that have previously accessed the second access point. The server sends the intelligent devices that have previously accessed the second access point to the first access point, so that the first access point can send the network identifier and the password of the first access point to the intelligent devices, and that the intelligent devices can switch from the second access point to the first access point.

In an existing network configuration solution, when network reconfiguration needs to be performed for an intelligent device for which a network is configured, such as an intelligent socket, an intelligent curtain, or an intelligent lamp, because a manner of reentering a network configuration mode by each intelligent device is different (for example, a switch needs to be long-pressed for the intelligent socket, and a user needs to climb to a high place to tap a reset button for the intelligent curtain), generally the user needs to perform a manual operation to restore factory settings of each intelligent device separately. Therefore, operation costs of the user are very high, and a required network configuration time is also very long. Consequently, network configuration efficiency is low, and user experience is poor.

However, in the embodiments of this application, an intelligent device that has previously accessed a WIFI network through network configuration can access a pre-connected network based on a network identifier and a password previously used for accessing the WIFI network, obtain a network identifier and a password of a new WIFI network by using the pre-connected network, and automatically access the new WIFI network without a manual operation of the user. Therefore, network configuration efficiency and user experience can be improved.

Particularly, in a scenario in which network reconfiguration needs to be performed for a large quantity of intelligent devices when an access point is changed or a network identifier/or a password of a WIFI network corresponding to an access point is modified or the like, according to the methods provided by the embodiments of this application, the intelligent devices can automatically switch to a new WIFI network in batches. Therefore, network reconfiguration is implemented for the large quantity of intelligent devices, and user experience is better.

In addition, it should be noted that, in the embodiments of this application, the initial network configuration solution and the network reconfiguration solution provided by the foregoing embodiments may be used together. After initial network configuration or network reconfiguration, network configuration may be performed again by using the network reconfiguration solutions in the foregoing embodiments.

In addition, in the network configuration solutions provided by the embodiments of this application, an intelligent device in a network-unconfigured state may automatically access the pre-connected network, and switch from the pre-connected network to the WIFI network to enter a network-configured state; and an intelligent device in the network-configured state may automatically switch to the new WIFI network, without being restored to the network-unconfigured state for network configuration.

It should be further noted that, the network access methods are described above by using an example in which the wireless network is a WIFI network. When the wireless network is another wireless network such as Bluetooth, infrared, or zigbee, the foregoing network access methods may still be used to perform network configuration for the intelligent device. This is not described in the embodiments of this application.

The solutions provided by the embodiments of this application are described above from a perspective of interaction between network elements. It may be understood that, to implement the foregoing functions, each network element, for example, the access point, the intelligent device, the user equipment, or the server, includes a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules in the access point, the intelligent device, the user equipment, and the server may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that, in the embodiments of this application, module division is an example, and is merely logical function division. In actual implementation, another division manner may be used.

When each functional module is defined in a correspondence to each function, for a possible schematic composition diagram of an electronic device in the foregoing embodiment, refer to FIG. 3. Specifically, the electronic device may be an access point, an intelligent device, user equipment, a server, or a chip.

A processor 120 may be configured to control and manage an action of the electronic device, and may implement or execute each example logical block, module, and circuit described with reference to content disclosed in this application. Alternatively, the processor 120 may be a combination of processors implementing a computing function, for example, a combination of one or more microprocessors, or a combination of a DSP and a microprocessor. A wireless communications module 110 and an I/O interface 140 may be configured to support communication between the electronic device and another network entity, for example, may be a transceiver, a transceiver circuit, or a communications interface. A memory 130 may be configured to store program code, data, and the like of the electronic device.

Figure 4:
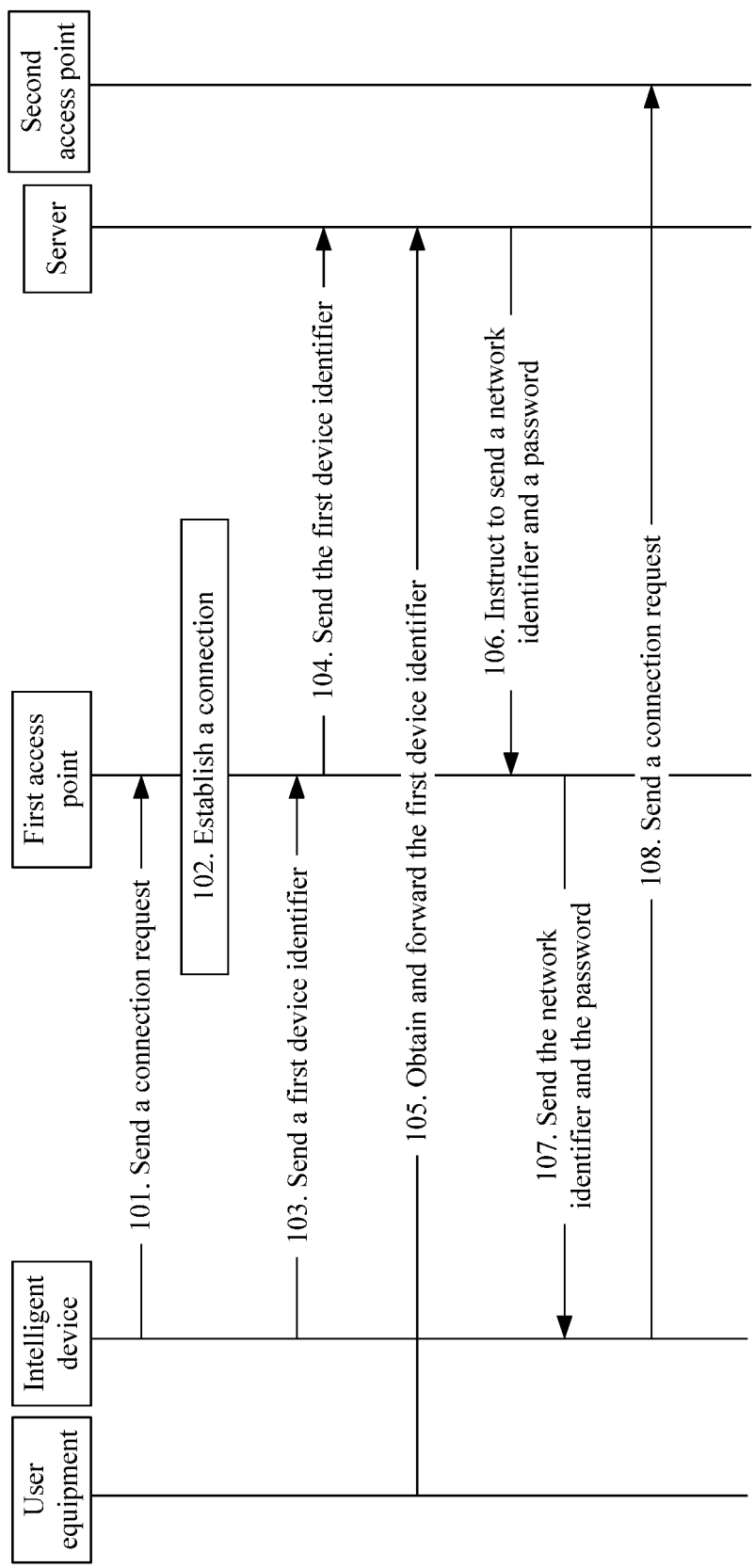
FIG. 4 is a flowchart of a network access method according to an embodiment of this application.
Figure 18:
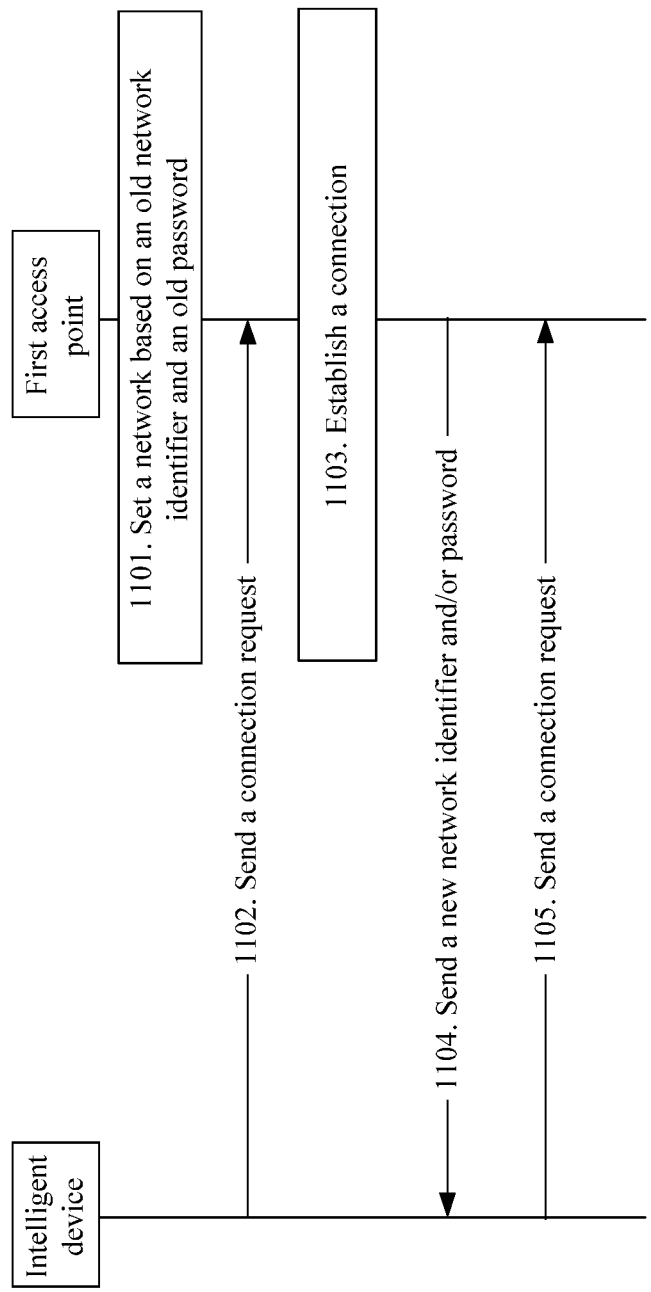
FIG. 18 is a flowchart of another network access method according to an embodiment of this application.

Specifically, when the electronic device is an access point, the processor may be configured to support the access point in performing step 102 in FIG. 4, step 202 in FIG. 6, step 602 in FIG. 15, and step 1101 and step 1103 in FIG. 18; and/or used in another process of the technology described in this specification.

When the electronic device is a server, the processor 120 may be configured to support the server in determining whether a first device identifier of an intelligent device matches n device identifiers; and/or used in another process of the technology described in this specification.

Figure 13:
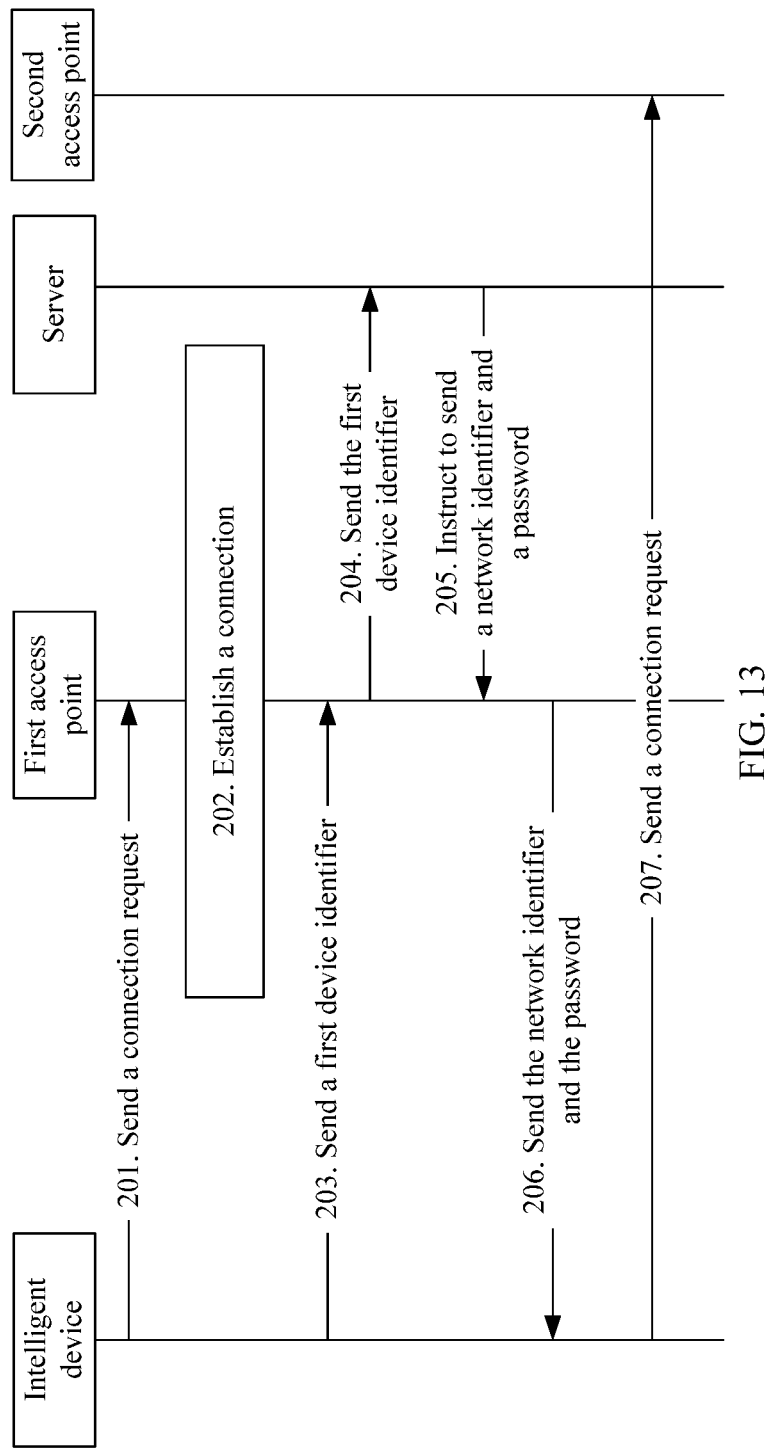
FIG. 13 is a flowchart of another network access method according to an embodiment of this application.
Figure 14:
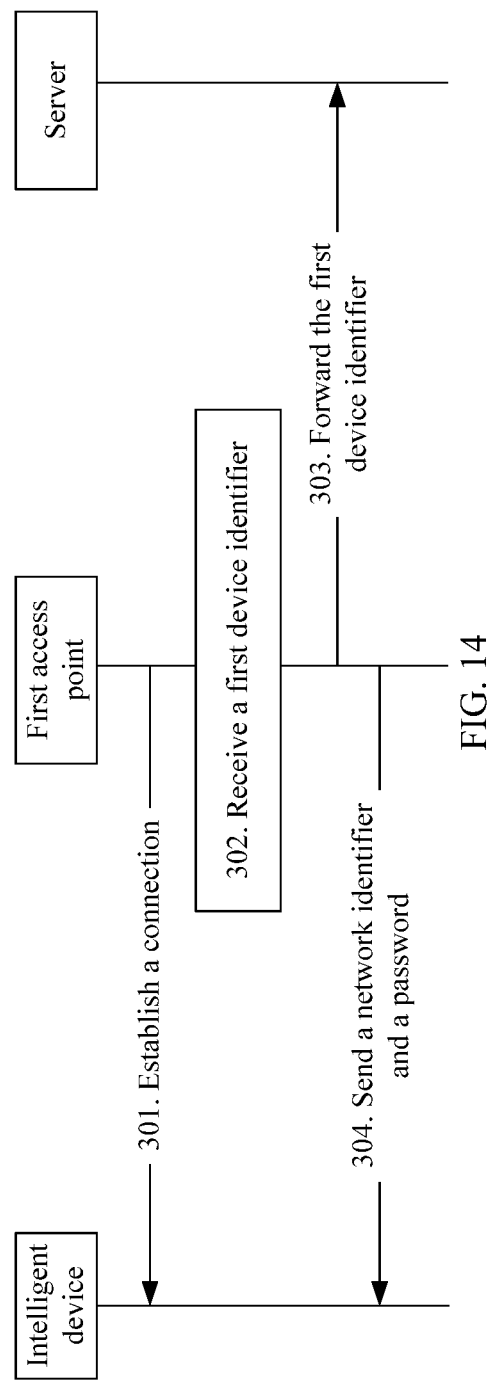
FIG. 14 is a flowchart of another network access method according to an embodiment of this application.

When the electronic device is an access point, the wireless communications module 110 and the I/O interface 140 may be configured to support the access point in performing step 104 and step 107 in FIG. 4, step 204 and step 206 in FIG. 13, step 302 and step 303 in FIG. 14, step 606 in FIG. 15, and step 1104 in FIG. 18; and/or used in another process of the technology described in this specification.

When the electronic device is an intelligent device, the wireless communications module 110 and the I/O interface 140 may be configured to support the intelligent device in performing step 101, step 103, and step 108 in FIG. 4, step 201, step 203, and step 207 in FIG. 13, step 601, step 603, and step 607 in FIG. 15, and step 1102 and step 1105 in FIG. 18; and/or used in another process of the technology described in this specification.

When the electronic device is user equipment, the wireless communications module 110 and the I/O interface 140 may be configured to support the user equipment in performing step 105 in FIG. 4 and step 604 in FIG. 15; and/or used in another process of the technology described in this specification.

When the electronic device is a server, the wireless communications module 110 and the I/O interface 140 may be configured to support the server in performing step 106 in FIG. 4, step 205 in FIG. 13, and step 605 in FIG. 15; and/or used in another process of the technology described in this specification.

When the electronic device is an access point, the memory 103 may be configured to support the access point in storing n device identifiers sent by a server, storing network identifiers and passwords before and after modification by the access point, and storing a device identifier of an intelligent device accessing a WIFI network of the access point, and the like; and/or used in another process of the technology described in this specification.

When the electronic device is an intelligent device, the memory 130 may be configured to support the intelligent device in storing a network identifier and a password of an access point, a device identifier of the intelligent device, and the like; and/or used in another process of the technology described in this specification.

When the electronic device is a server, the memory 130 may be configured to support the server in storing the first mapping relationship to the sixth mapping relationship; and/or used in another process of the technology described in this specification.

It should be noted that all related content of the steps in the method embodiments can be cited in the descriptions of functions of the corresponding functional modules, and details are not described again herein.

The electronic device provided by this embodiment of this application is configured to perform the foregoing network access method, and therefore can achieve a same effect as the foregoing network access method.

In addition, an embodiment of this application further provides an apparatus, where the apparatus may be specifically a chip, a component, or a module, and the apparatus may include a processor and a memory that are connected; the memory is configured to store a computer-executable instruction; and when the apparatus runs, the processor may execute the computer-executable instruction stored in the memory, so that the chip performs the network access method in each of the foregoing method embodiments.

An embodiment of this application further provides a system, where the system may include an access point, an intelligent device, user equipment, and a server. When there are a plurality of access points, the access points may include a first access point and a second access point. Each electronic device in the system may be configured to perform the network access method shown in FIG. 4 or FIG. 15.

An embodiment of this application further provides a system, where the system may include an access point, an intelligent device, and user equipment. When there are a plurality of access points, the access points may include a first access point and a second access point. Each electronic device in the system may be configured to perform the steps performed by the access point, the intelligent device, and the user equipment in FIG. 4 or FIG. 15.

An embodiment of this application further provides a system, where the system may include an access point, an intelligent device, and a server. When there are a plurality of access points, the access points may include a first access point and a second access point. Each electronic device in the system may be configured to perform the network access method shown in FIG. 13, and the network access method described in steps 201 to 207 or steps 701 to 706.

An embodiment of this application further provides a system, where the system may include an access point and an intelligent device, and the access point and the intelligent device may be configured to perform the network access method shown in FIG. 18.

The foregoing descriptions about implementations allow a person skilled in the art to understand that, for the purpose of convenient and brief description, division of the foregoing functional modules is used as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network access method, wherein the method comprises:
    receiving, by a first access point, a first network identifier and a first password of a second access point from a server, wherein the server stores a mapping relationship between the first access point and network parameters of the second access point, and wherein the network parameters of the second access point comprise the first network identifier and the first password;
    setting, by the first access point, a first network based on the first network identifier and the first password of the second access point;
    sending, by an intelligent device, a first network connection request to the first access point, wherein the first network connection request comprises the first network identifier and the first password;
    establishing, by the first access point, a first network connection between the first access point and the intelligent device in response to the first network connection request;
    sending, by the first access point, at least one of a second network identifier or a second password of the first access point to the intelligent device by the first network connection; and
    sending, by the intelligent device, a second network connection request to the first access point based on the at least one of the second network identifier or the second password of the first access point.

2. The method according to claim 1, wherein the network parameters of the second access point further comprise n device identifiers, where n is a positive integer; and
    wherein before the sending, by the first access point, at least one of the second network identifier or the second password of the first access point to the intelligent device, the method further comprises:
        sending, by the intelligent device, a first device identifier of the intelligent device to the first access point;
        forwarding, by the first access point, the first device identifier to the server; and
        after the first device identifier matches the n device identifiers, instructing, by the server, the first access point to send the second network identifier and the second password of the first access point to the intelligent device.

3. The method according to claim 2, wherein the sending, by the first access point, at least one of the second network identifier or the second password of the first access point to the intelligent device comprises:
    sending, by the first access point in response to the instruction of the server, the second network identifier and the second password of the first access point to the intelligent device.

4. The method according to claim 1, wherein the network parameters of the second access point further include n device identifiers, where n is a positive integer; and
    wherein before the sending, by the first access point, at least one of the second network identifier or the second password of the first access point to the intelligent device, the method further comprises:
        sending, by the intelligent device, a first device identifier of the intelligent device to the first access point;
        sending, by the server to the first access point, the n device identifiers corresponding to the second access point; and
        after the first device identifier matches the n device identifiers, sending, by the first access point, the second network identifier and the second password of the first access point to the intelligent device.

5. A network access method, comprising:
    receiving, by a first access point, a first network identifier and a first password of a second access point from a server;
    setting, by the first access point, a first network based on the first network identifier and the first password of the second access point; and after establishing a first network connection between the first access point and an intelligent device, sending, by the first access point, at least one of a second network identifier or a second password of the first access point to the intelligent device by the first network connection;

wherein before the sending, by the first access point, at least one of the second network identifier or the second password of the first access point to the intelligent device, the method further comprises:

receiving, by the first access point, a first device identifier of the intelligent device from the intelligent device;

receiving, by the first access point, n device identifiers corresponding to the second access point and sent by the server, where n is a positive integer; and after the first device identifier matches the n device identifiers, sending, by the first access point, the second network identifier and the second password of the first access point to the intelligent device.

6. The method according to claim 5, wherein before the sending, by the first access point, at least one of the second network identifier or the second password of the first access point to the intelligent device, the method further comprises:

forwarding, by the first access point, the first device identifier to the server, wherein the first device identifier is useable by the server to determine whether the n device identifiers correspond to the second access point match.

7. The method according to claim 6, wherein the sending, by the first access point, at least one of the second network identifier or the second password of the first access point to the intelligent device by the first network connection comprises:

sending, by the first access point in response to an instruction of the server, the second network identifier and the second password of the first access point to the intelligent device by the first network connection.

8. A system, comprising:
an intelligent device; and
a first access point, wherein the first access point is configured to:
receive a first network identifier and a first password of a second access point from a server, wherein the server stores a mapping relationship between the first access point and network parameters of the second access point, and wherein the network parameters of the second access point comprise the first network identifier and the first password; and set a first network based on the first network identifier and the first password of the second access point;

wherein the intelligent device is configured to:
send a first network connection request to the first access point, wherein the first network connection request comprises the first network identifier and the first password;

wherein the first access point is further configured to:
establish a first network connection between the first access point and the intelligent device in response to the first network connection request; and send at least one of a second network identifier or a second password of the first access point to the intelligent device by the first network connection;

wherein the intelligent device is further configured to send a second network connection request to the first access point based on the at least one of the second network identifier or the second password of the first access point.

9. The system according to claim 8, wherein the network parameters of the second access point further comprise n device identifiers, where n is a positive integer;

wherein the intelligent device is further configured to send a first device identifier of the intelligent device to the first access point; and wherein the first access point is further configured to forward the first device identifier to the server; and after the first device identifier matches the n device identifiers, send the second network identifier and the second password of the first access point to the intelligent device.

10. The system according to claim 8, wherein the sending at least one of the second network identifier or the second password of the first access point to the intelligent device comprises:

sending, in response to an instruction of the server, the second network identifier and the second password of the first access point to the intelligent device.

* * * * *